US007800776B2

(12) United States Patent
Goel et al.

(10) Patent No.: US 7,800,776 B2
(45) Date of Patent: Sep. 21, 2010

(54) METHODS AND APPARATUS FOR MIXED PAGE IMPOSITION

(75) Inventors: Puneet Goel, Union City, CA (US); Vivek Tandon, Sunnyvale, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 822 days.

(21) Appl. No.: 11/674,052

(22) Filed: Feb. 12, 2007

(65) Prior Publication Data

US 2007/0127073 A1 Jun. 7, 2007

Related U.S. Application Data

(63) Continuation of application No. 10/047,505, filed on Oct. 26, 2001, now Pat. No. 7,177,045.

(60) Provisional application No. 60/283,816, filed on Apr. 13, 2001.

(51) Int. Cl.
*G06F 15/00* (2006.01)

(52) U.S. Cl. ....................... 358/1.2; 358/1.18; 358/450; 358/451; 382/284; 382/289; 382/291; 382/294; 382/295; 382/296; 382/297; 382/298

(58) Field of Classification Search .................. 358/1.2, 358/1.18, 450, 451; 382/284, 289, 291, 294–298
See application file for complete search history.

(56) References Cited

U.S. PATENT DOCUMENTS

| | | | |
|---|---|---|---|
| 4,951,233 | A | 8/1990 | Fujiwara et al. |
| 4,984,773 | A | 1/1991 | Balban et al. |
| 5,495,561 | A | 2/1996 | Holt |
| 5,732,403 | A | 3/1998 | Nakamura |
| 5,768,488 | A | 6/1998 | Stone et al. |
| 5,809,218 | A | 9/1998 | Kastenholz |
| 5,987,461 | A | 11/1999 | Dreyer et al. |
| 5,988,899 | A | 11/1999 | Benson et al. |
| 6,046,818 | A | 4/2000 | Benson |
| 6,101,513 | A | 8/2000 | Shakib et al. |
| 6,205,452 | B1 | 3/2001 | Warmus et al. |
| 6,236,463 | B1 | 5/2001 | Cyman et al. |
| 6,393,988 | B1 | 5/2002 | Gaskin |
| 6,414,755 | B1 | 7/2002 | Bronstein et al. |

FOREIGN PATENT DOCUMENTS

| | | | |
|---|---|---|---|
| EP | 0330343 | A2 | 8/1989 |
| EP | 0495563 | | 7/1992 |
| EP | 0858041 | | 8/1998 |
| EP | 0887746 | A2 | 12/1998 |
| EP | 0905647 | | 3/1999 |
| JP | 10333314 | | 12/1998 |
| WO | WO 01/16790 | | 3/2001 |

*Primary Examiner*—David K Moore
*Assistant Examiner*—Mark R Milia
(74) *Attorney, Agent, or Firm*—Michael A. Glenn; Glenn Patent Group

(57) ABSTRACT

Methods and apparatus are provided for imposing multiple pages on a printable sheet, in which the multiple pages include pages of varying size. The printable sheet is divided into a plurality of slots, and each of the pages is assigned to a corresponding slot. User-specified settings are received for page alignment, offset and scaling for each of the slots, and the page alignment, offset and scaling of each of the pages are individually adjusted based on the user specifications.

9 Claims, 20 Drawing Sheets

METHODS AND APPARATUS FOR MIXED PAGE IMPOSITION

REFERENCE TO RELATED APPLICATIONS

This application is a continuation of U.S. patent application Ser. No. 10/047,505, filed 26 Oct. 2001, now U.S. Pat. No. 7,177,045, which claims priority from U.S. Provisional Patent Application No. 60/283,816, filed 13 Apr. 2001.

BACKGROUND

The invention relates generally to methods and systems for printing computer-generated images. More particularly, the invention relates to methods and systems for assembling and formatting documents in preparation for printing.

In print shop environments, content from multiple sources is often merged to create a new document. For example, in the production of an illustrated calendar, photographs may be scanned to produce the calendar illustrations. The scans are then interleaved with calendar pages, which may have been produced in a page layout program or a word processor. Generally, before the document is output to a color printer, additional layout and job options are specified, such as single-side vs. duplex printing, resolution, color profile and print profile. In particular, page imposition, in which selected individual pages are imposed on a single sheet, is an extremely useful layout option. The individual pages are arranged on the sheet to yield a proper page sequence in the finished document. Page imposition greatly facilitates post-printing processes such as collating, cutting, and binding, so that a printed document with the pages in the correct order results.

Various methods and systems for page imposition are known. For example, Stone et al. U.S. Pat. No. 5,768,488 describes a page placement process that enables user-defined placement of pages in an N-up environment. Holt U.S. Pat. No. 5,495,561 describes an object-oriented printing interface having a page imposition feature. Benson U.S. Pat. No. 6,046,818 describes a method for imposing and rendering a plurality of non-overlapping pages to be printed on a single sheet. Any of these examples would be well suited for producing a document such as the calendar described above, in which all of the pages to be imposed are of the same size and page orientation. However, all suffer the common limitation of being unable to impose pages of varying sizes and page orientations.

Thus, there remains a need in the art for a process for imposing pages of varying sizes and orientations. It would be a significant advance to implement such a process as a server-based software application in a network environment, enabling the user to perform the various steps of the imposition process in any software application, from any workstation on the network, and to output the finished print job to any print device on the network. It also would be desirable to furnish other advanced layout features, such as negative gutter size, customizable trim and fold marks, and specification of binding options.

SUMMARY

In recognition of such need, there is herein described methods and apparatus for formatting printable information in which data objects, generally images or pages from digital documents, are selected and ordered to create a new digital document comprising a number of printable pages. The printable pages may be of uniform dimension and page orientation, or they may vary in one or both of dimension and page orientation. Prior to printing, groups of printable pages are imposed on printable sheets in a manner such that the sequence of the printed pages matches the page sequence of the created digital document after post-printing processing steps such as folding, cutting, collating and binding.

One embodiment of the invention provides a method of imposing printable pages, the pages varying in one or both of dimension and orientation, on printable sheets, by means of a graphical user interface, in which a thumbnail image of a printable sheet is divided into separate slots. A printable page is placed into each slot by placing a thumbnail image of the printable page into the slot. Alignment, offset and scaling settings can be applied to individual slots, groups of slots or every slot on a sheet. Thereafter, a variety of other layout and job options are set prior to printing the document.

The invented methods and apparatus may be implemented as a server-based software application in a distributed printing environment. Furthermore, the invention also may be embodied as a computer program product for performing methods in accordance with this invention.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

This invention provides a network-based system and method for formatting printable information. A particular embodiment of the invention provides a method of imposing groups of printable pages on printable sheets prior to output of a print job to a printing device. Page imposition is a technique for ordering the pages that make up a document on sheets in such manner as to facilitate organizing the pages of the final printed document into the correct page sequence using post-printing processing techniques such as folding, cutting, collating and binding.

Figure 1:
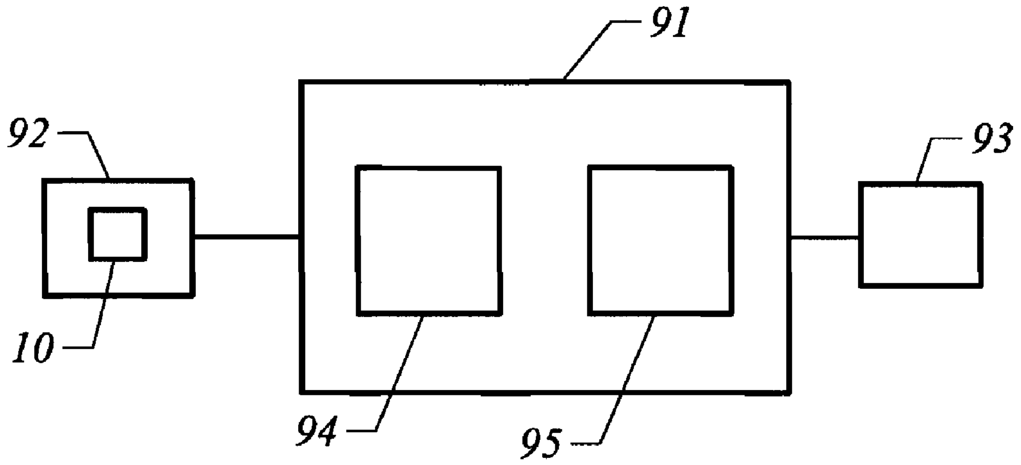
FIG. 1 shows a block diagram of a system for formatting printable information according to the invention.

FIG. 1 shows a network-based system for formatting printable information. The system includes a server 91, any number of workstations 92 connected to the server, and one or more output devices 93, also connected to the server. At workstation 92, users create a variety of data objects, which are subsequently selected and organized into a variety of digital documents. These data objects, typically pages created with word-processing or page layout programs, or images created with graphics programs, may exist in a large number of formats. Furthermore, they may be stored locally on workstation 92 or they may be stored on server 91. For purposes of organizing into digital documents, however, the data objects are converted to a common file format and stored on server 91, as a library of data objects 94. The common file format is a page description language. An exemplary embodiment of the invention uses portable document format ("PDF"), originally developed by Adobe Systems, Inc. of San Jose Calif. Alternatively, other page description languages may be used, such as PostScript, also developed by Adobe Systems, Inc. or PCL, developed by Hewlett-Packard Co. of Palo Alto Calif.

To select from the library of objects, thumbnail images of the objects, also stored on server 91, are displayed on workstation 92, and the user interacts with the thumbnail images, using a pointing device such as a mouse to select and arrange the desired objects. A page imposition application 95, resident on server 91, and accessed by the user by means of a GUI 10 residing on workstation 92, allows the user to perform page imposition and other layout and pre-print processing techniques on the print job before it is finally sent to the output device 93. In an exemplary embodiment, output device 93 may be either a color printer or a color copier programmed to function as a printer. However, output device 93 may, in fact, be any device having a print engine. In professional printing environments, high performance output devices may automatically perform post-printing techniques such as folding, cutting, collation and binding under the control of software programs residing on the server. Although the system has been described as including one server 91, the system may actually include more than one server, with each server performing a dedicated function. For example, the object library may be archived on a file server, and the software application may reside on an application server.

Figure 2:
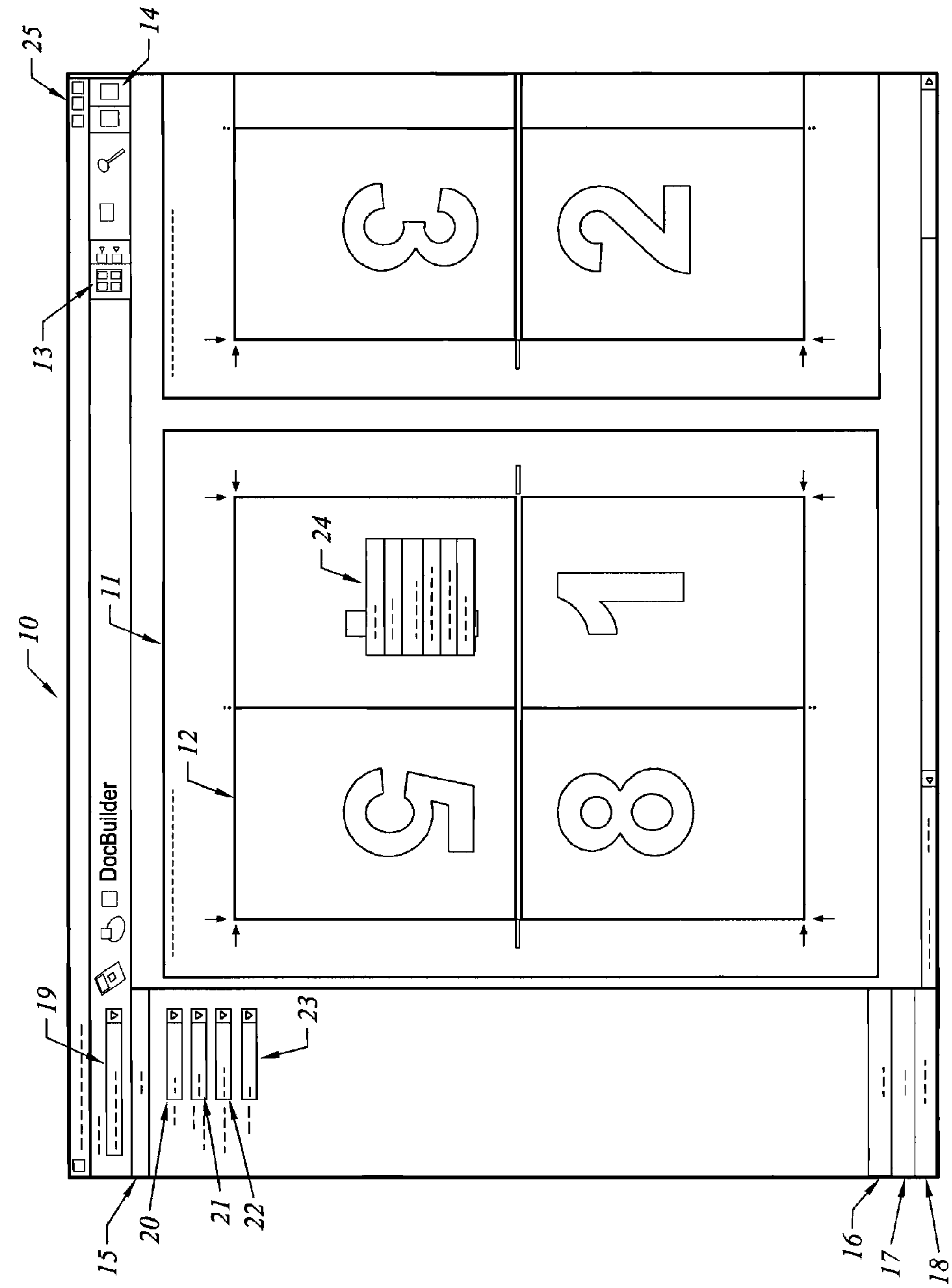
FIG. 2 shows a graphical user interface (GUI) of a page imposition application in preview mode according to the invention.
Figure 3:
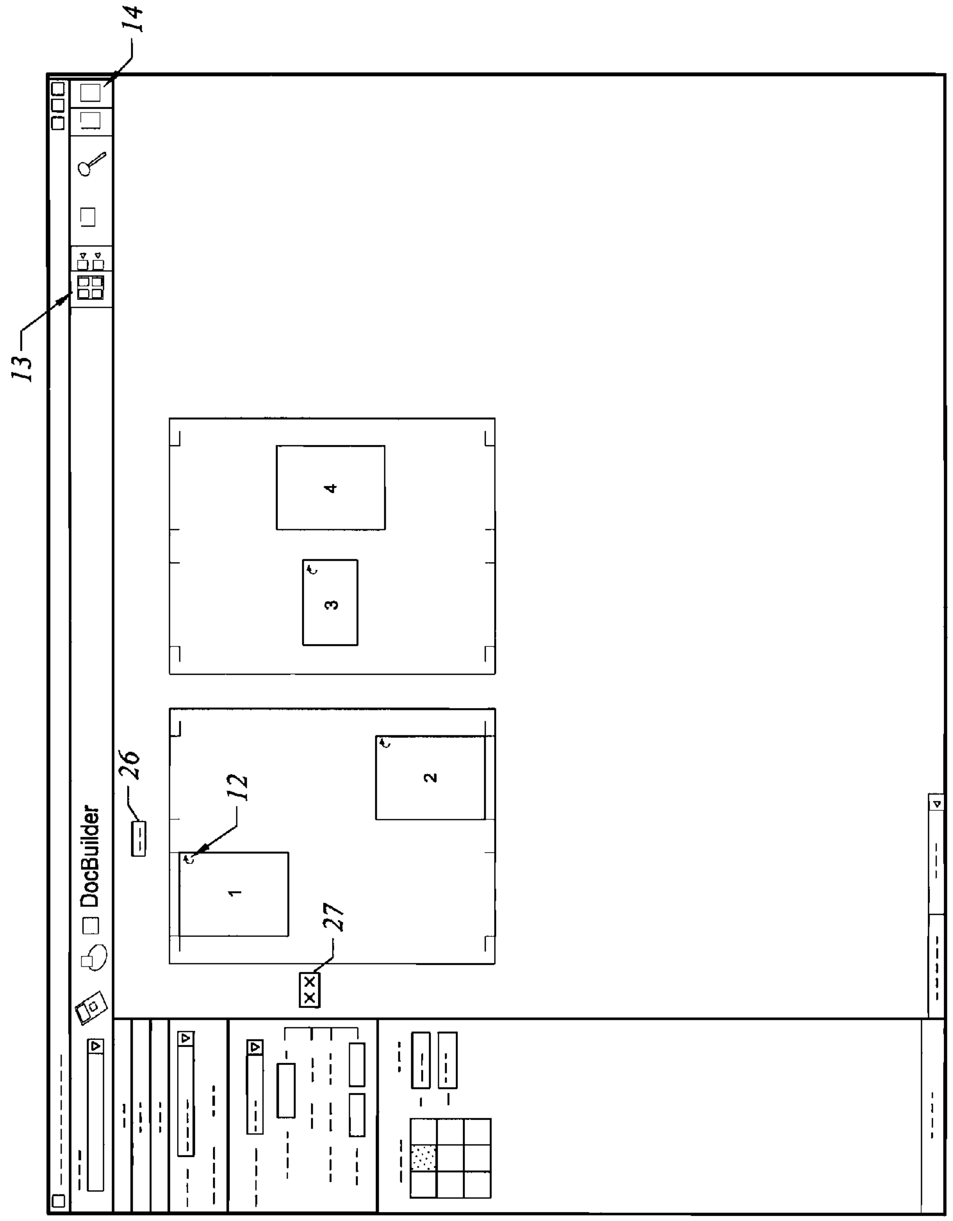
FIG. 3 shows the GUI of FIG. 2 in layout mode according to the invention.

Referring now to FIG. 2, shown is an exemplary GUI 10 in preview mode, resident on workstation 92, by which the user gains access to the imposition application 95. The user makes use of the application's various functionalities by activating the corresponding elements of the interface. In preview mode, a typical windowed workspace displays thumbnail images of the pages 12 of a print job on one or more printable sheets 11. Thus, the source file for a job may be modified by manipulating the page images in either preview mode, as shown in FIG. 2, or layout mode, as shown in FIG. 3. The pages 12 appear on the sheet 11 as a printer's spread, in the order in which they are to be printed as an imposed print job. Each sheet is divided into a number of "slots," or sections, each one intended to receive a page. The printable pages may include one or both of document pages and images. The various imposition attributes may be specified manually by interacting with the various interface elements and controls described below, or automatically through the application of a template. Templates are selected from a pulldown menu of templates 19. The user may specify a particular set of imposition attributes and then save the attribute set to a custom template for application to multiple print jobs, or the user may select from a number of built-in templates provided by the invention.

Page Modes

Advantageously, the invention is able to impose pages of varying size and shape in addition to conventional page imposition, in which pages of fixed size and orientation are imposed. Accordingly, a page mode selector 13 is provided for selecting either of:

Fixed page mode, for uniform pages; and

Mixed page mode, for pages that vary in dimension and/or orientation.

The "mixed page mode," apart from handling documents with pages of different dimensions, also enables a user to separately alter various imposition attributes for each page in the document. This facilitates the creation of many useful impositions. A duplexed brochure having a spread as described below is one such example. Many of these impositions can be stored as templates to be applied to different documents later. The construction of such impositions is not possible under the restriction that all the pages be of the same size.

Figure 4:
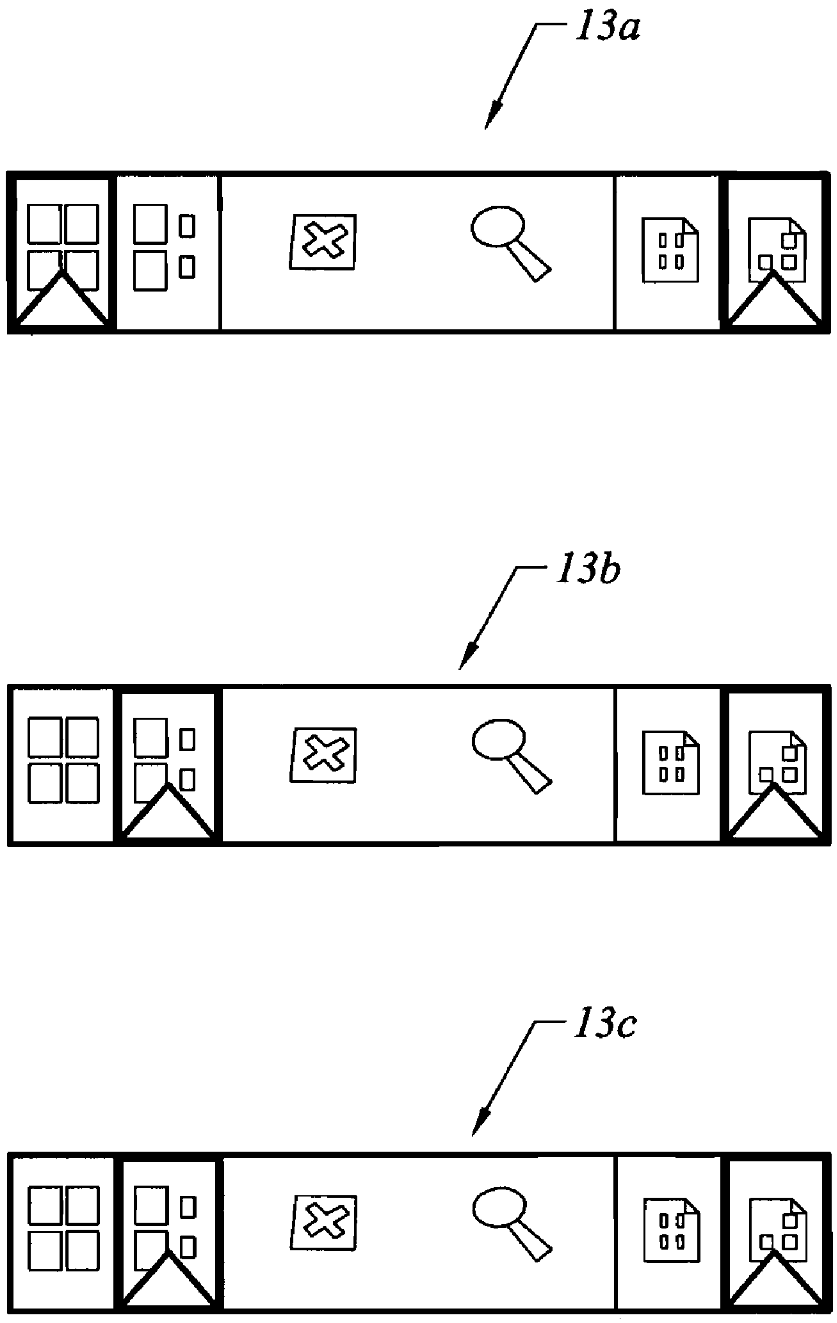
FIG. 4 shows a page mode selector from the GUI of FIG. 2 according to the invention.

FIG. 2 shows Fixed page mode selected and FIG. 3 shows Mixed page mode selected. As explained below, each mode offers a distinct array of user-settable imposition attributes, although there is considerable overlap between attribute arrays for the two page modes. FIG. 4 provides a detailed view of the various settings available in the page mode selector. As indicated at 13*a*, fixed page mode is the default mode for a job containing pages of fixed size and orientation. Reference numeral 13*b* denotes mixed page mode. It will be appreciated that, for a fixed page job, the user is allowed to switch between modes. As shown at 13*b*, for a mixed page job, only the mixed page mode is available. In this case, the selector for fixed page mode is grayed-out.

View Modes

View mode selector buttons 14 allow the user to switch between preview and layout modes. Preview mode approximates the appearance of the final printed output very closely, imposing thumbnail images of the pages on the sheet. Layout mode, shown in FIG. 3, displays numbered, generic pages 12 that allow the user to determine location of source document pages in the imposed job.

Imposition Settings

Imposition settings apply to the job currently displayed in the main window. Because the imposition settings usually affect the job's printed layout, they are saved with the job and used whenever the job is opened. Changes to imposition settings are applied to the job in real time, but are not saved permanently until the job is saved. The various imposition attributes are organized according to category, the categories being:

Sheet, which allows specification of paper characteristics on which the job is to be printed;

Layout, which specifies number, ordering and rotation of pages on a sheet;

Scale to enlarge or shrink pages by specified amounts, and to specify positioning within a slot; and Finishing, for specifying binding and gang printing settings.

Access to the attribute settings is gained through a series of pulldown menus 15, 16, 17 and 18, one menu provided for each category of attributes.

Table 1, below, provides a listing of the various imposition attributes, organized by category, along with an indication of which page mode the attribute is associated with, and usage constraints.

TABLE 1

| FEATURES | FIXED PAGE MODE | MIXED PAGE MODE |
|---|---|---|
| Sheet | | |
| Size | Yes | Yes |
| Creep Adjustment | Yes | Yes |
| Orientation | Yes | Yes |
| Duplex | Yes | Yes |
| Layout | | |
| Row/Columns | Yes | Yes |
| Printer's Marks | Yes | Yes |
| Printer's Marks customizable | Yes | Yes |
| Pull in to page edge | No | Yes |
| Bleeds | Yes | No |
| Bleeds Definable | Yes | No |
| Scaling | | |
| Apply to | Not editable All slots on surface | Editable Current Slot Row on all surfaces Column on all surfaces All slots on all surfaces |
| Scale Mode | Editable Scale to fit Custom | Editable Scale to fit Custom Fit width Fit height |
| Scale Factor/ Finish Height and Width | Disabled when under: Scale to fit mode Enabled when: Custom mode | Disabled when under: Scale to fit Fit width Fit height Enabled when under: Custom |
| Alignment/ Offsets | Disabled | Disabled when under: Scale to fit Enabled when under: Custom Fit width Fit height |
| Finishing | | |
| Binding | Yes | Yes |
| Gang Up | Yes | Yes |
| Drop Menu | | |
| Add sheets | Yes | Yes |
| Duplicate Sheet | Yes | Yes |
| Delete Sheet(s) | Yes | Yes |
| Edit Page | Yes | Yes |
| Preview Mode | | |
| Negative | Yes | Yes |
| Gutter Size | | |
| Page Rotation | 180 Deg increment | 90 Deg increment |

Each attribute will be discussed in greater detail below.

In FIG. 2, the "Sheet" menu 15 is shown pulled down to reveal a lower level of menus for the various "Sheet" attributes:

Size (20);

Sheet (21);

Orientation (22); and

Duplex (23).

Because "Sheet" settings affect virtually every other aspect of the imposition process, it is preferable that they should be specified immediately upon opening a job in the main window. "Size" allows specification of sheet size. A number of built-in sheet sizes are provided, or the user can specify a custom sheet size. "Creep adjustment" provides either "plain" or "thick" settings, or the user can specify a thickness value from 0-2" (or the equivalent in another unit of measurement). "Orientation" allows the user to rotate the sheet, either 90° or 180°. Setting "Duplex" to "on" specifies double-sided printing, setting it to "off" specifies single-sided printing.

Figure 5:
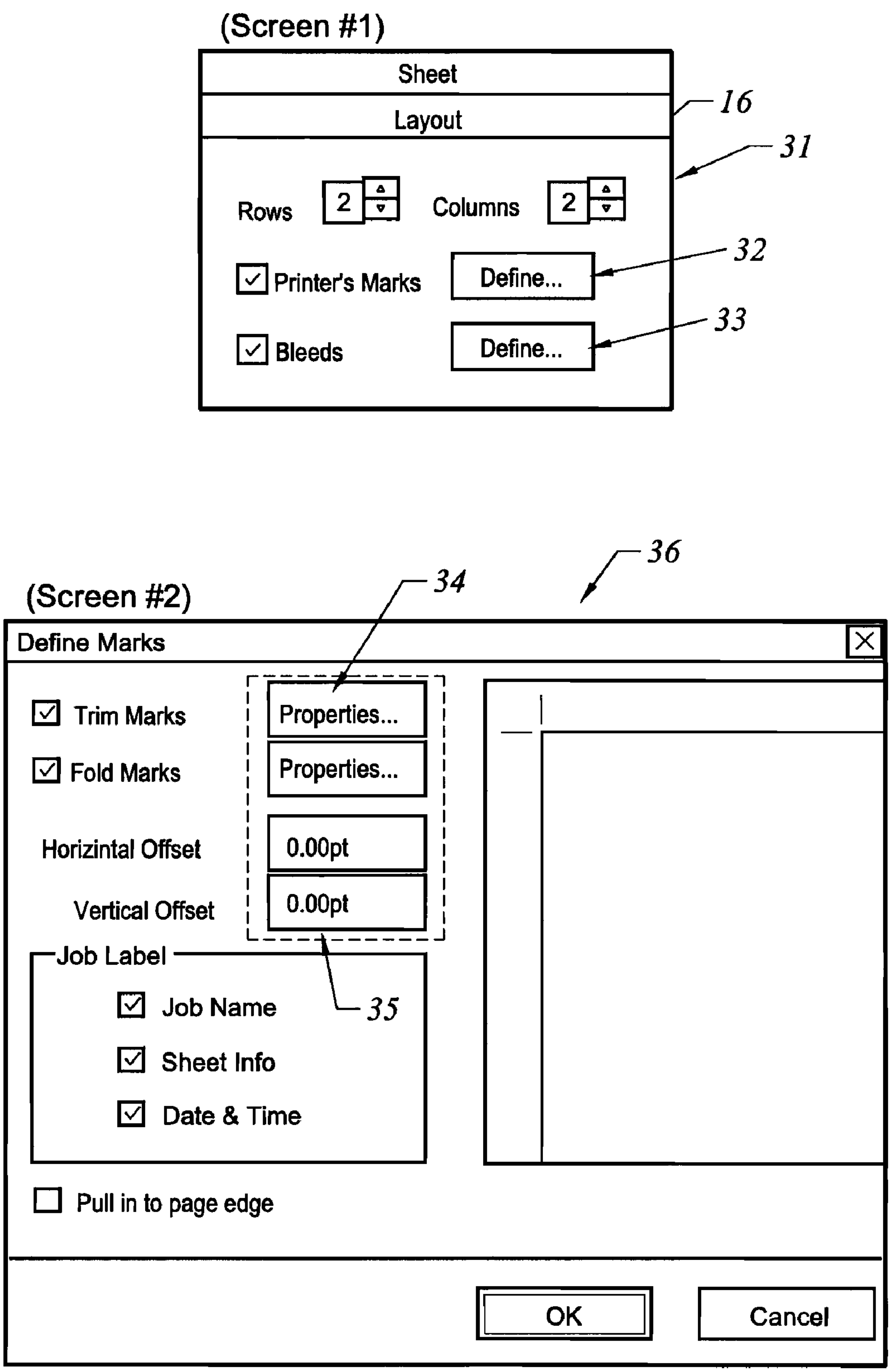
FIG. 5 shows a "Layout" pull down menu from the GUI of FIG. 2 according to the invention.
Figure 6:
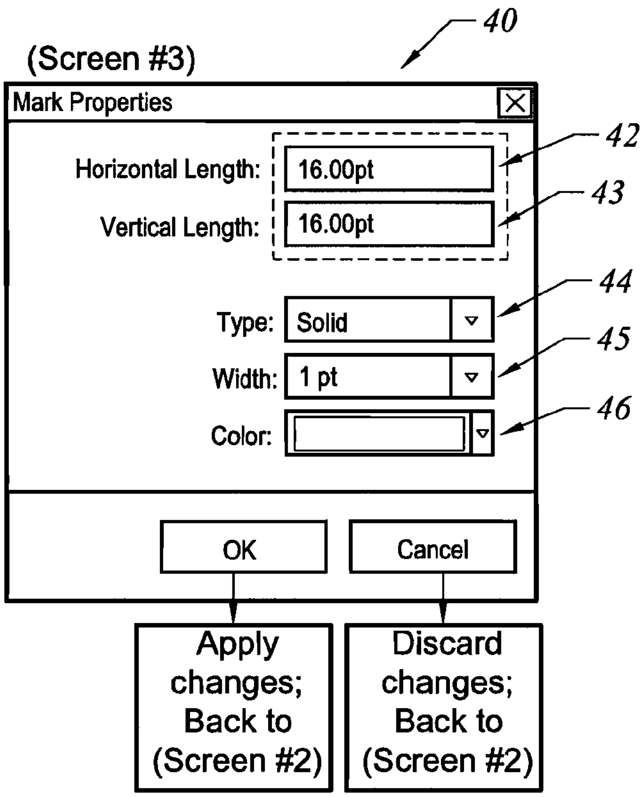
FIG. 6 shows a list box for defining printer's marks from the pulldown menu of FIG. 5 according to the invention.
Figure 6:
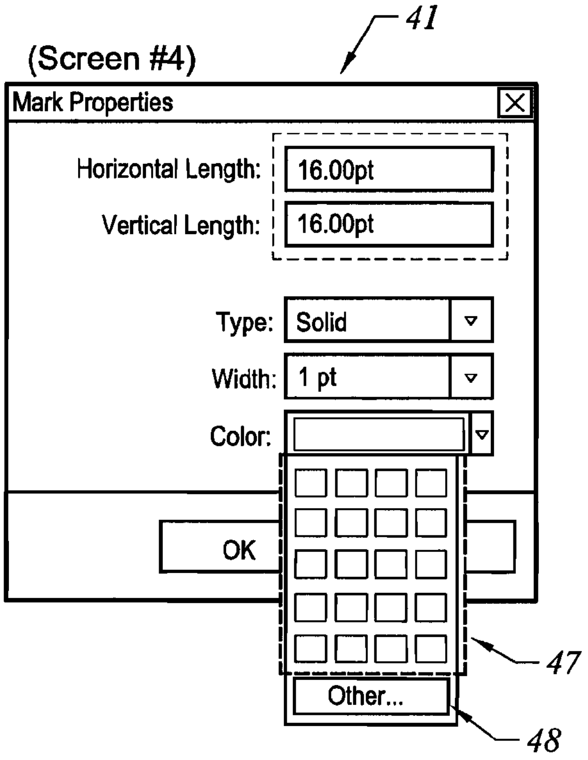

FIG. 5 shows the "Layout" menu 16 pulled down to reveal the various features available. "Rows" and "Columns" allow the number of rows and columns 31 in a sheet layout to be specified, each to a maximum of five per sheet. As illustrated, the settings specify a sheet with four pages imposed, two rows by two columns. Buttons for defining printer's marks 32 and bleeds 33 are provided. As indicated in Table 1, the "Bleeds" feature is available only in Fixed page mode. By selecting the printer's marks button 32, the user is granted access to screen #2 (36) through which the user is able to set properties for trim marks and fold marks. A text box 35 allows values to be entered specifying horizontal and vertical offsets, thus altering the default placement of the trim and fold marks. Buttons 34 grant access to screen #3 (40) and screen #4 (41) (See FIG. 6) for setting trim and fold mark properties, respectively. Referring to screen #3, the user specifies trim marks properties as follows Horizontal length (42);

Vertical length (43);

Line type (44);

Line width (45); and

Line color (46).

The controls in Screen #4, for fold marks operate in the same manner. In either screen #3 or #4, the user may select line color from a chart of selections 47, or a "Other" button 48 grants access to a further screen (not shown) having a color matrix for specifying a custom color.

Figure 7:
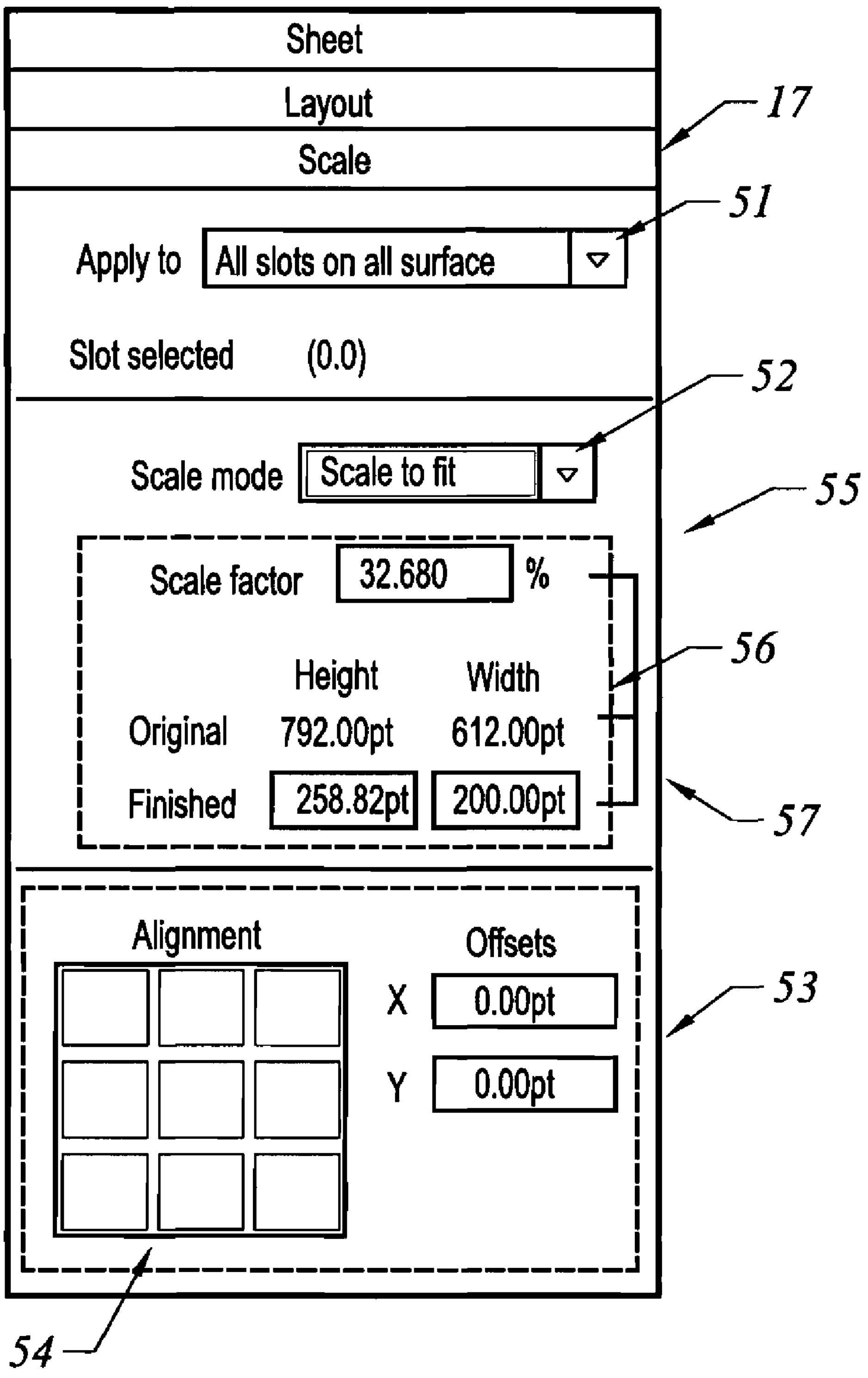
FIG. 7 shows a view of a "Scale" pulldown menu in Fixed page mode from the GUI of FIG. 1 according to the invention.

FIG. 7 shows the "Scale" menu 17 pulled down in Fixed page mode. As previously described, the page mode is selected by means of the page mode selector 13. In Fixed page mode, the "Apply to" field 51 is disabled; scaling settings are automatically applied to all pages on all surfaces in Fixed page mode. As Table 1 shows, in Fixed page mode, two scale modes 52 are available: "Scale to fit" and "Custom." Here, "Scale to fit" is selected. When the custom scale mode is selected, Scale Factor 55, Original/Finished Height and Width 56, 57, disabled under "Scale to fit" mode are enabled. However, the values for Scale Factor, Original/Finished Height and Width are proportionally constrained. Thus, when the user enters data in one field, values for the other two fields are automatically calculated, based on the entered value. Although it is possible to supply values that would cause the page image to extend beyond the slot, the image would be clipped, specified by a clipping icon (not shown). In Fixed page mode, alignment 54 and offset 53 are disabled. Default values are automatically applied.

Figure 8:
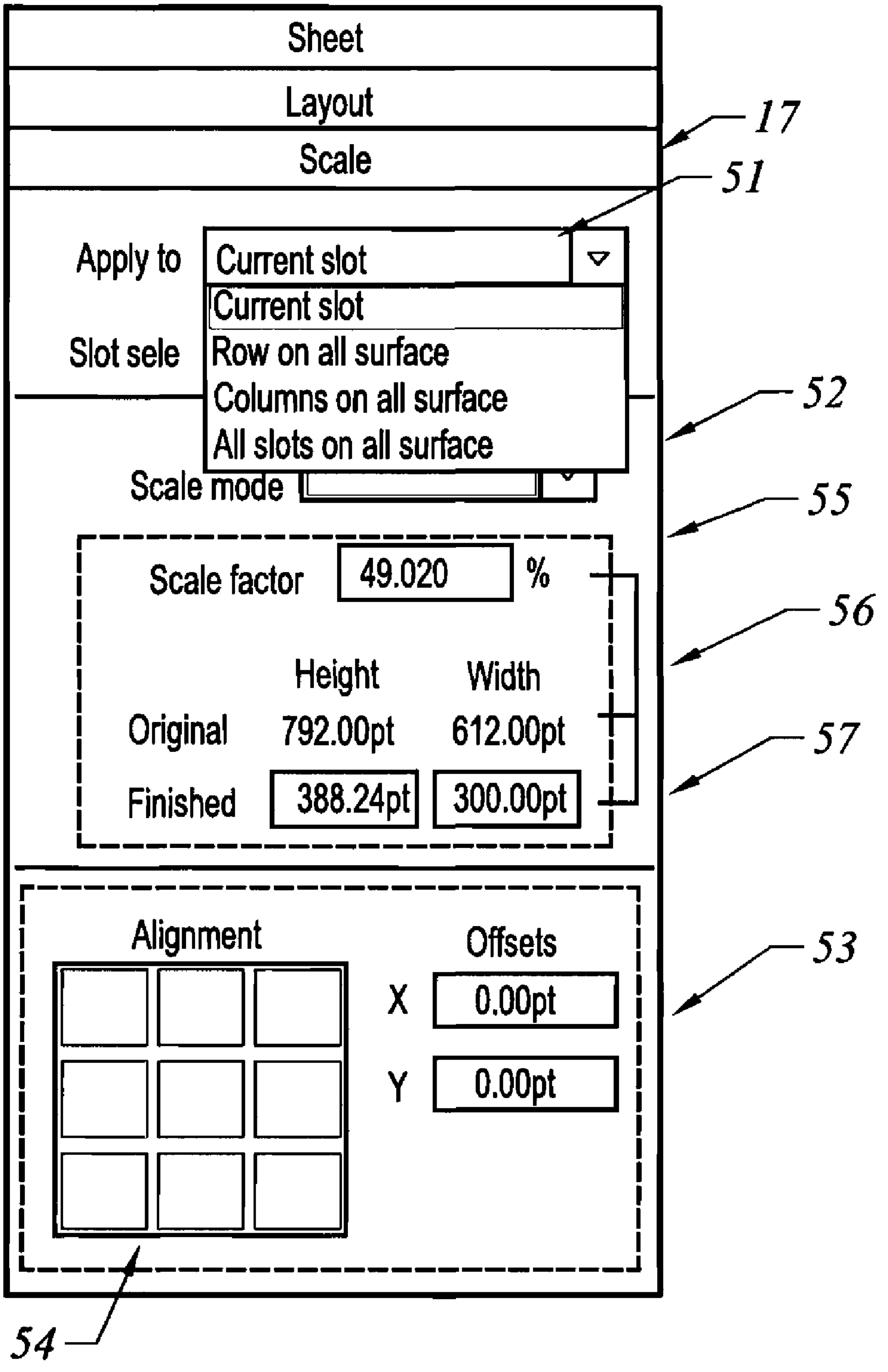
FIG. 8 shows a view of a "Scale" pulldown menu in Mixed page mode from the GUI of FIG. 2 according to the invention.

FIG. 8 shows the "Scale" menu 17 as it appears in Mixed page mode. Unlike Fixed page mode, scaling parameters can be applied to individual slots or groups of slots. The options available from the menu in the "Apply to" field 51 include:

Current slot;

Row on all surfaces;

Column on all surface; and

All slots on all surfaces.

All four options are available at any time, regardless of scale mode selected.

Scale modes 52 available include:

Scale to fit;

Custom;

Fit width; and

Fit height.

"Scale to fit" is the default mode, wherein all pages are scaled to best-fit within the slots. Because the job may contain pages of varying size, the scale factor 55 may vary, although it cannot be edited. To view the scale factor for a particular page, the user can specify the page by selecting the corresponding slot in either layout or preview mode. The user may switch between scale modes at any time. However, when switching to "Scale to fit," any previous scale mode settings are discarded. Alignment 54 and Offsets 53 are not editable under "scale to fit."

In Mixed page mode, with the "Custom" scale mode 52 selected, the user is free to enter Scale Factor 55, and Original/Finished Height and Width 56, 57. As in Fixed page mode, these settings are proportionally constrained, so that when a user enters data in one field, the other fields are automatically adjusted. Alignment 54 and Offset 53 are enabled. Using Alignment 54 the user can align a page within a slot with the following settings:

Upper-Left

Upper-Center;

Upper-Right;

Center-Left;

Center-Center;

Center-Right;

Lower-Left;

Lower-Center; and

Lower-Right.

Using Offset 53, the page placement can be further adjusted, using the current Alignment position as the starting point for the offset. If Alignment settings change, the Offset values return to zero.

In Mixed page mode, with the "Fit Width" scale mode 52 selected, the page width is scaled to best-fit the slot. Scale Factor, and Finished Height and Width are calculated based on slot width and Original Width. Alignment and Offsets are available.

In Mixed page mode, with the "Fit Height" scale mode 52 selected, the page height is scaled to best-fit the slot. Scale Factor, and Finished Height and Width are calculated based on slot height and Original Height. Alignment and Offsets are available.

Figure 9A:
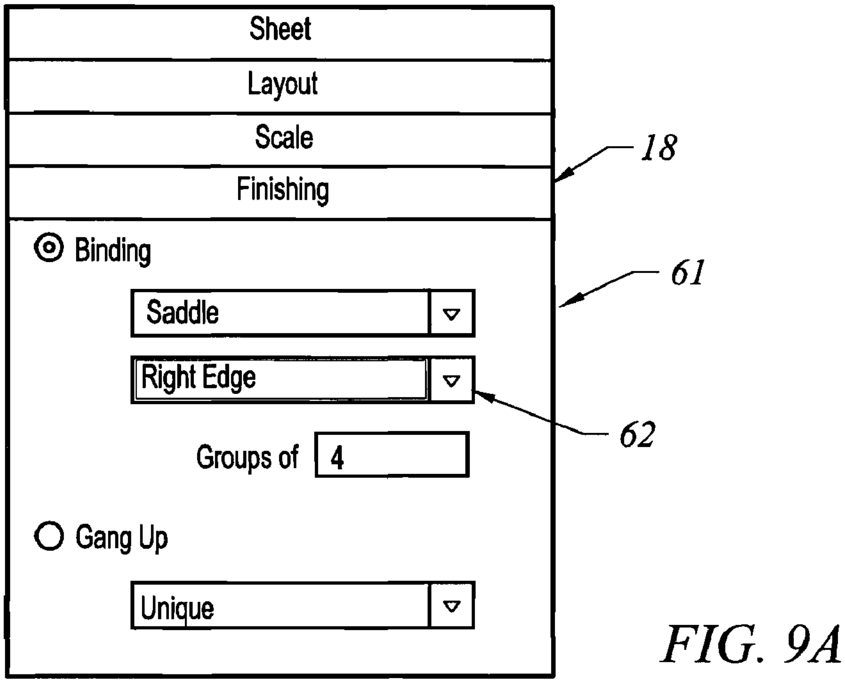
FIG. 9 shows a "Finishing" menu from the GUI of FIG. 2 according to the invention.

FIG. 9 shows two separate views of the "Finishing" pulldown menu 18. Using the "Finishing" pulldown, the user specifies Binding and Gang printing options. As shown in FIG. 9A, enabling Binding options 61 disables Gang up options 63. Binding options 61 include:

Saddle;

Nested Saddle; and

Perfect.

In addition, the user specifies a binding edge 62. "Left" is selected for a document that reads from left to right. "Right" is selected for a document that reads from right to left, for example those written in Asian or middle-Eastern languages.

Figure 9B:
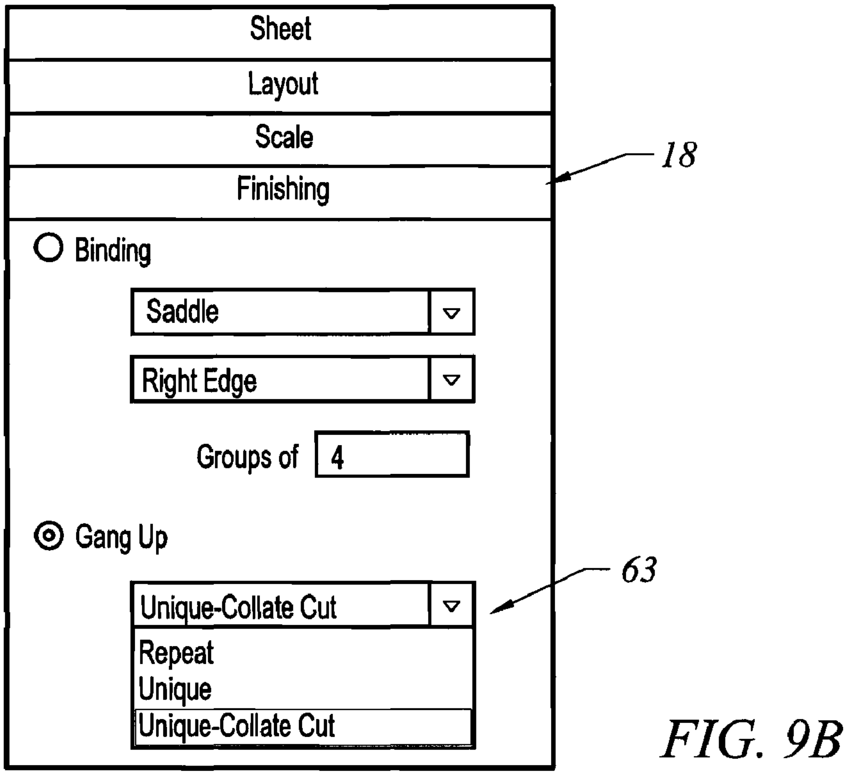

As shown in FIG. 9B, enabling Gang Up options 63, disables Binding options. In Gang printing, multiple pages are placed on a sheet for "collate and cut" finishing rather than imposing them in an order required for a particular binding method. The following Gang up methods are available:

Repeat—places multiple copies of a page on a sheet until the sheet is filled. For example, the front side of sheet one is filled with images of page 1, the rear side is filled with images of page two, the front side of sheet two is filled with images of page 3, and the rear side with images of page four, etc.

Unique—places the pages in an appropriate order for printing a single copy of a job. This option does not fully collate itself, thus requiring hand collation, but it optimizes sheet size while limiting the run to a single copy.

Figure 10:
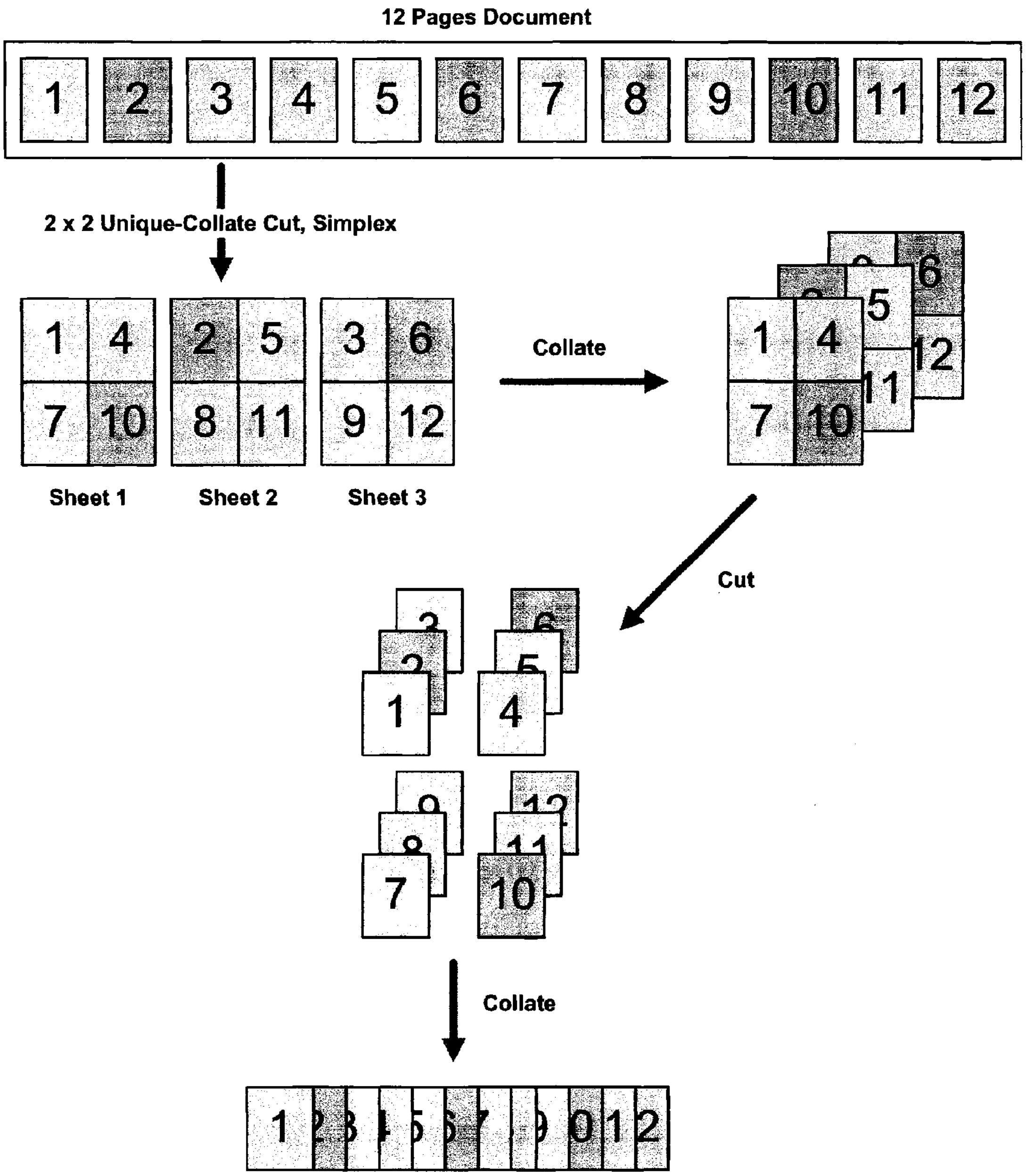
FIG. 10 provides a diagram of a technique for gang printing according to the invention.

Unique-Collate Cut—(Shown in FIG. 10) places pages in arrangement that allows the page to fall into the correct order when the sheets are folded, stacked and cut. This option minimizes the necessity of collating by hand and is most appropriate for printing single copies of a document.

Templates

As mentioned earlier, the user may specify imposition settings for a job by applying a predefined template. Settings that can be saved to a template include but are not limited to:

Page orientation;

Single-sided or double-sided printing;

Rows and columns

Printer's marks "on" and "off;"

Job label;

Bleeds "on" and "off,"

Bleed definition;

Scale mode—"Scale to fit;"

Scale mode—"Fit width;"

Scale mode—"Fit height;"

Alignment;

Binding method;

Binding edge;

Group of;

Gang up method;

Gutter size;

Page rotation; and

Page numbering.

In addition to user-specified custom templates, the invention provides a number of built-in templates, including but not limited to:

1-up full bleed;

2-up perfect;

2-up saddle;

3-up trifold brochure;

4-up gate fold;

4-up head to head; and 4-up z-fold.

Adding, Duplicating and Deleting Sheets

Figure 11:
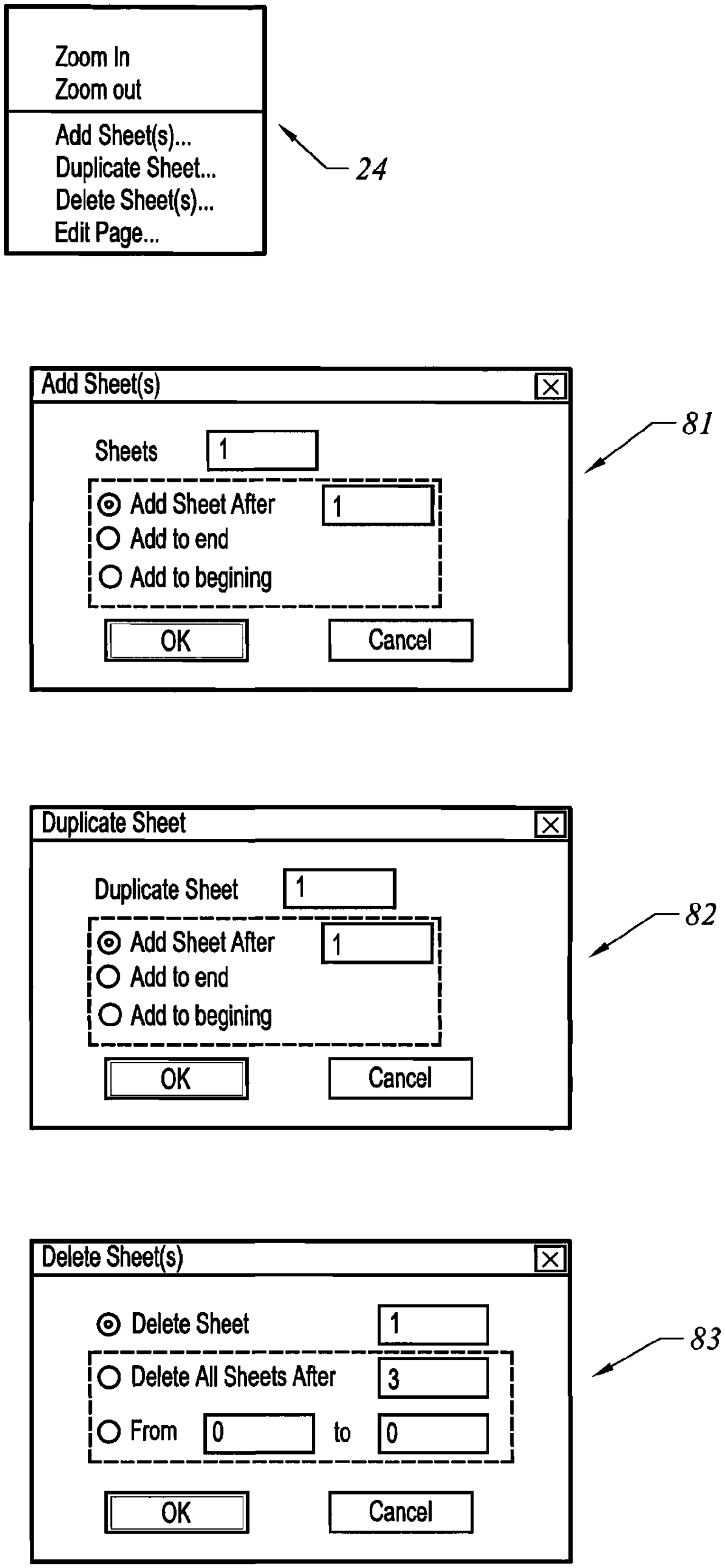
FIG. 11 shows a drop down menu for managing sheets from the GUI of FIG. 2 according to the invention.

A drop down menu 24 is accessed by clicking the right mouse button in any layout or preview area. FIG. 11 shows detailed views of the dropdown menu 24. The dropdown provides the following options:

Zoom in;

Zoom out;

Add sheets;

Duplicate sheet; and

Edit page.

"Zoom in" and "Zoom out" are conventional magnification features commonly provided in desktop applications. "Add sheets" allows the user to add one or more new sheets to the print job as shown in the dialog box 81. The sheet or sheets may be added at the beginning, the end or at another user-selected point in the sheet sequence. "Duplicate sheet," as shown in the dialog box 82, allows the user to duplicate an existing sheet and add it to the print job at the beginning, the end or at another user-selected point in the sheet sequence. "Delete sheet," as shown in the dialog box 83, allows the user to select one or more sheets and delete them from the job. "Edit page" allows the user to apply late edits to individual pages prior to printing.

Gutter Size

Methods and apparatus in accordance with this invention automatically govern the locations of gutters according to the layout and sheet size governing imposition for the job. The user can also specify gutter size by entering a value in its vertical gutter size field 26 or its horizontal gutter size field 27. It is also possible to specify a negative gutter value, for example, to join together two pages located in adjacent slots, or to offset the effect of an excess bleed value.

Imposition settings and any other job modifications are saved by activating the "Close" button 24 on the window.

Methods and apparatus in accordance with this invention may be implemented using conventional programming techniques known to those skilled in the art of computer programming.

EXAMPLE: A Brochure Having a Spread

The steps outlined below create a four page, duplexed brochure containing two inner pages and a cover consisting of a single continuous image spread across two pages.

Required Document: A PDF document having three pages; where the third page (cover page) is twice the size of the first two pages, (inner pages) e.g., a file with two letter size pages and one 11×17 cover page.

Figure 12:
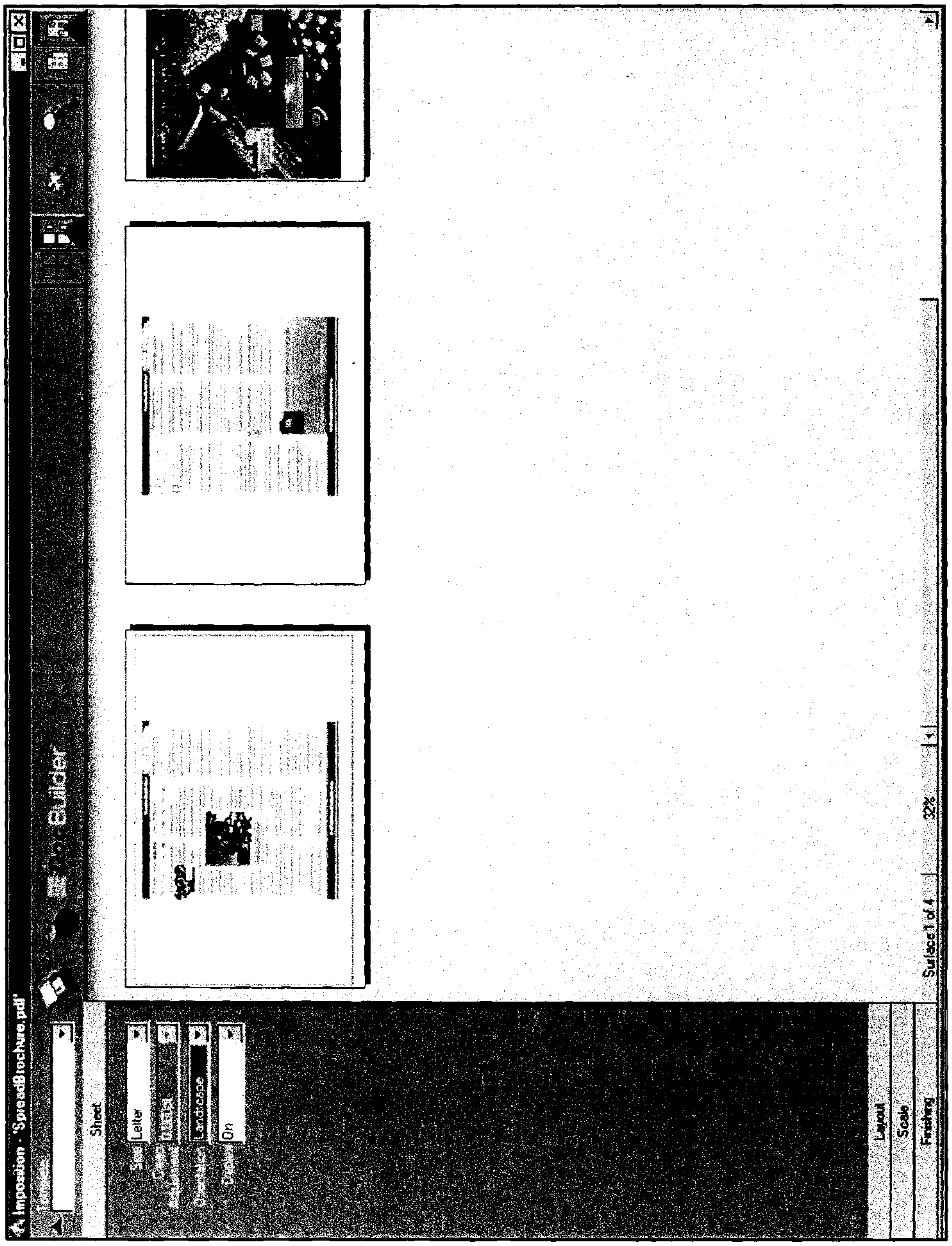
FIGS. 12-19 are screen shots showing an example of a brochure having a spread according to the invention.
Figure 13:
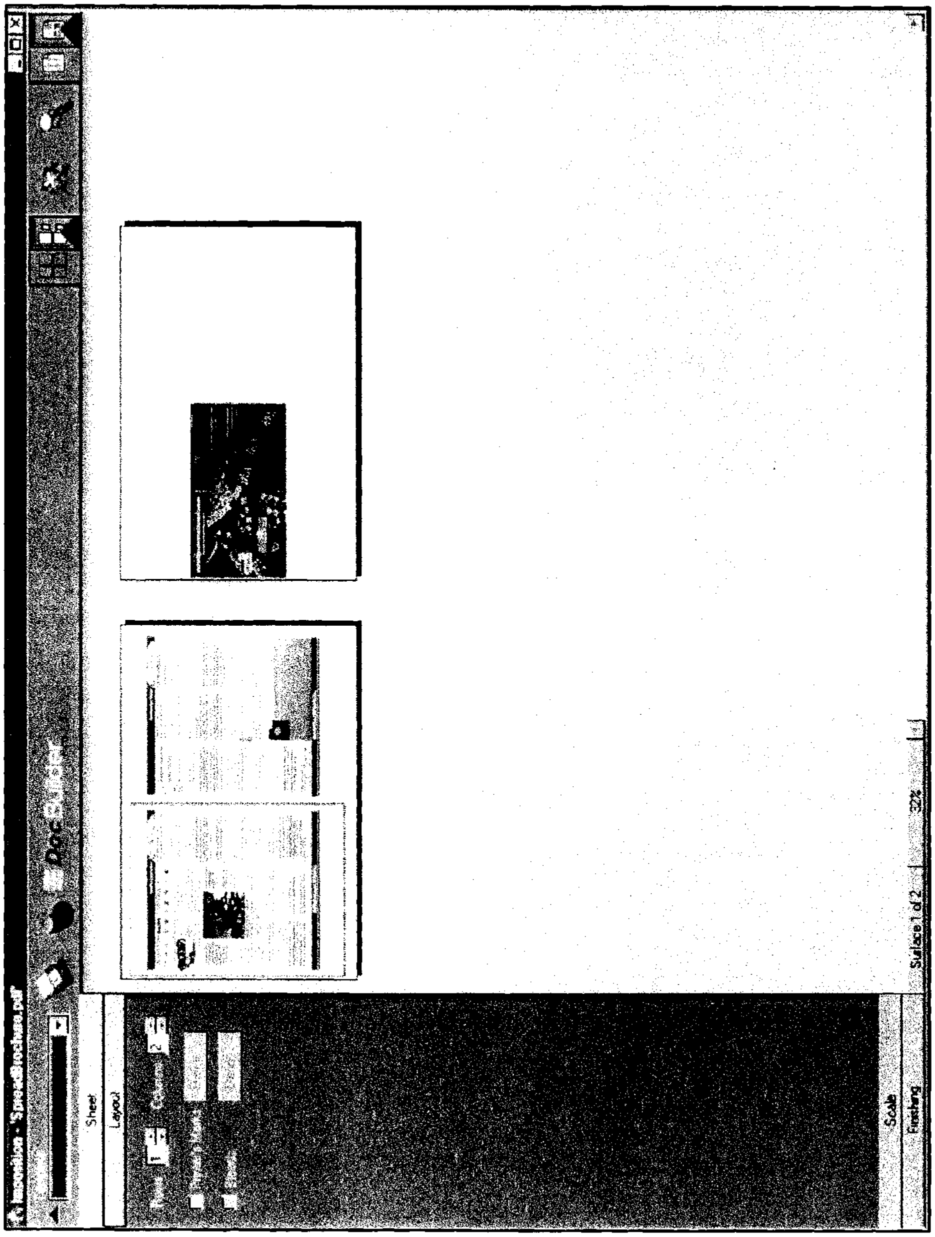
Figure 14:
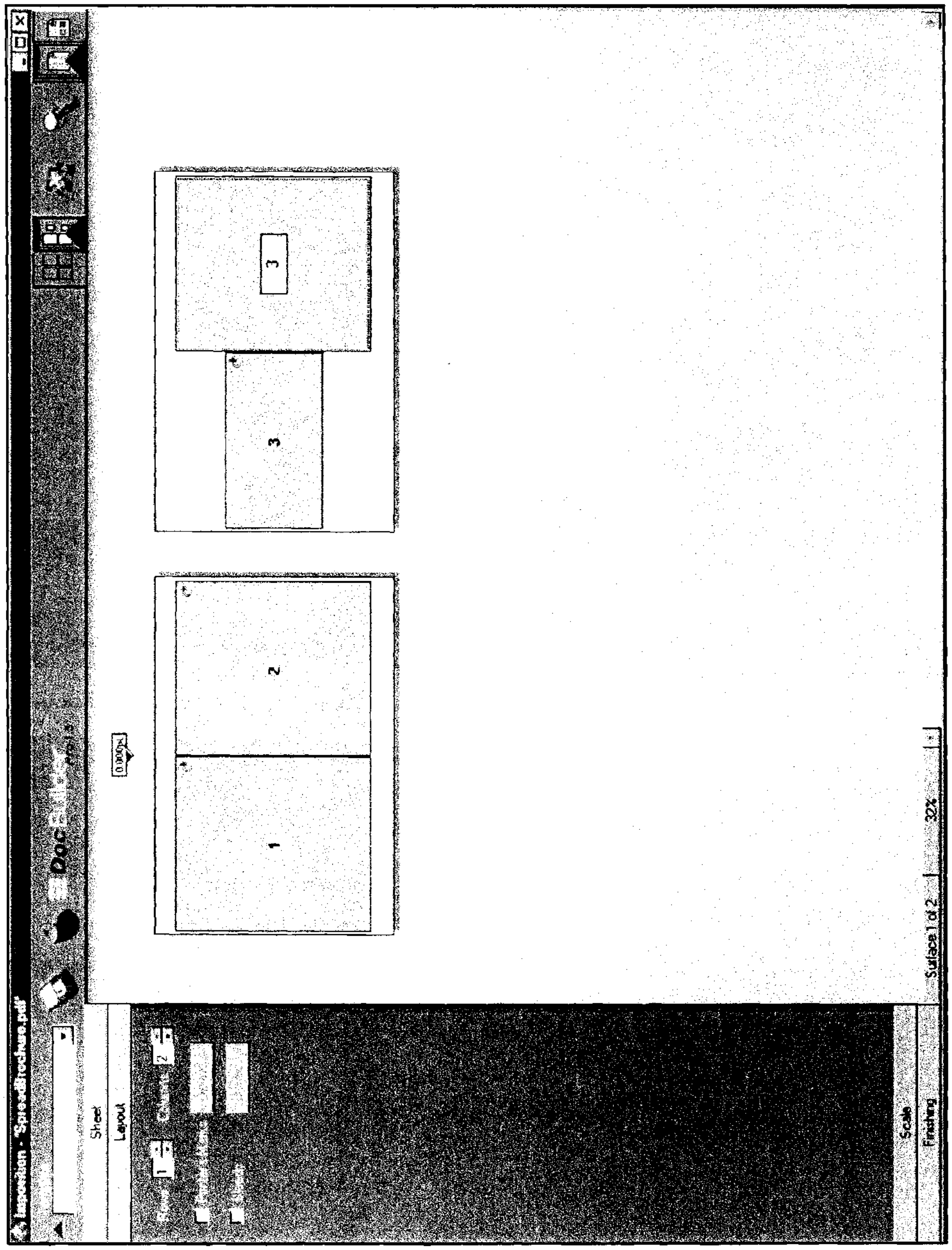
Figure 15:
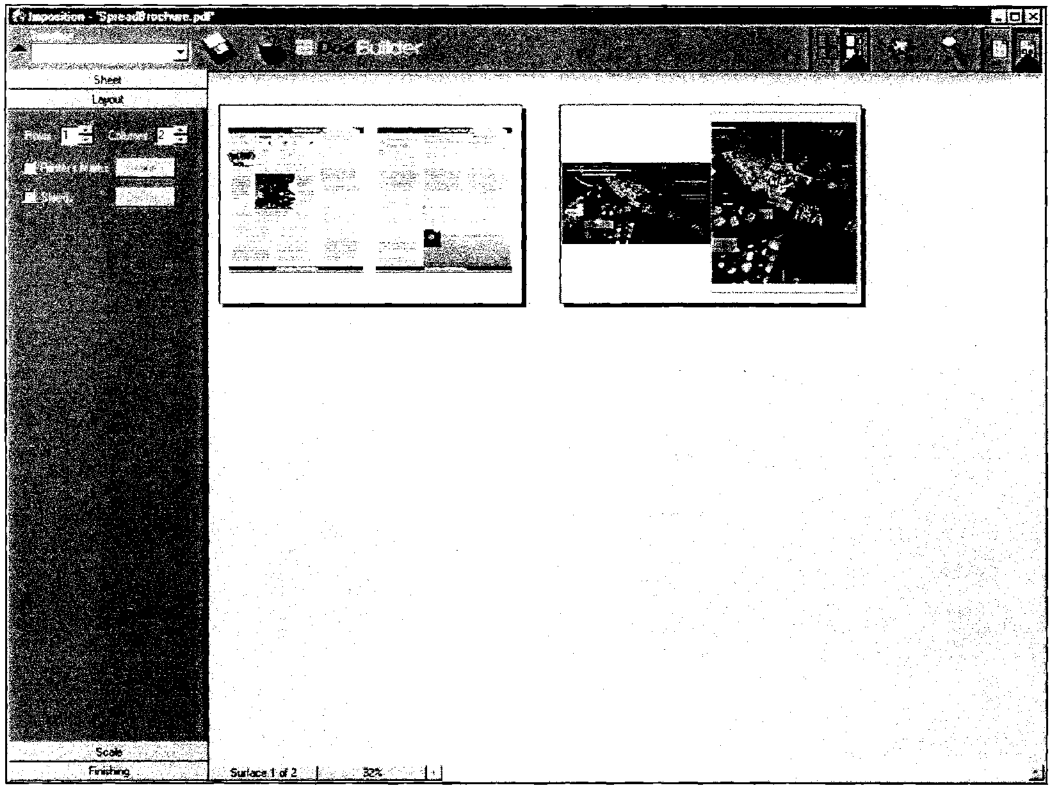
Figure 16:
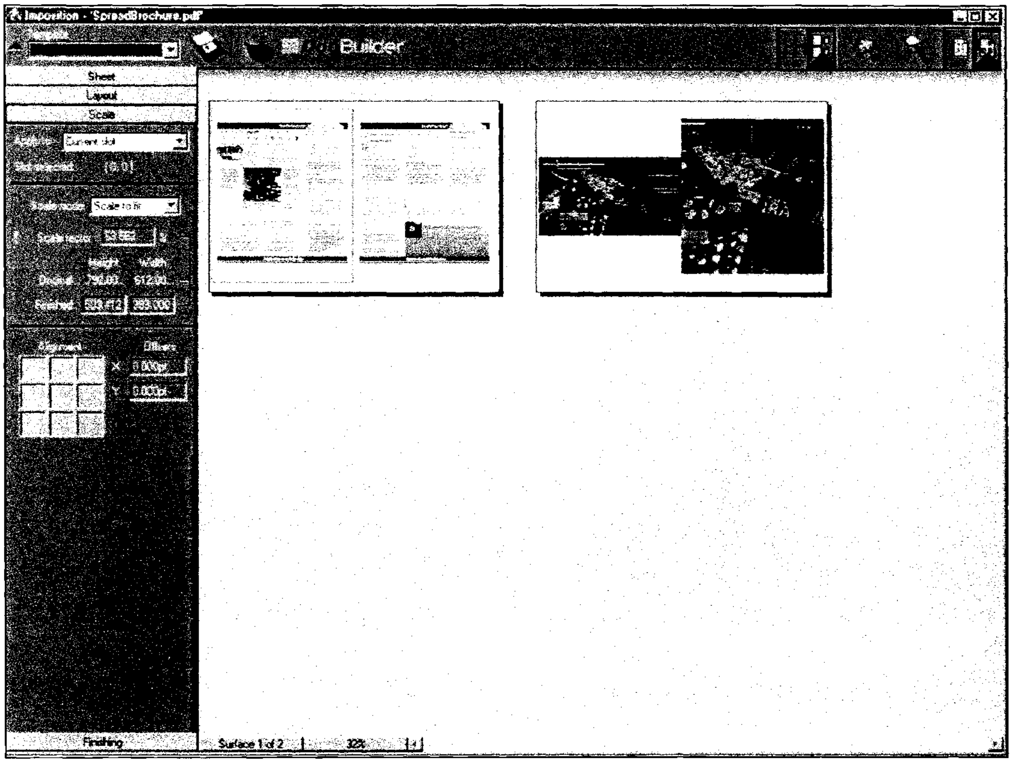
Figure 17:
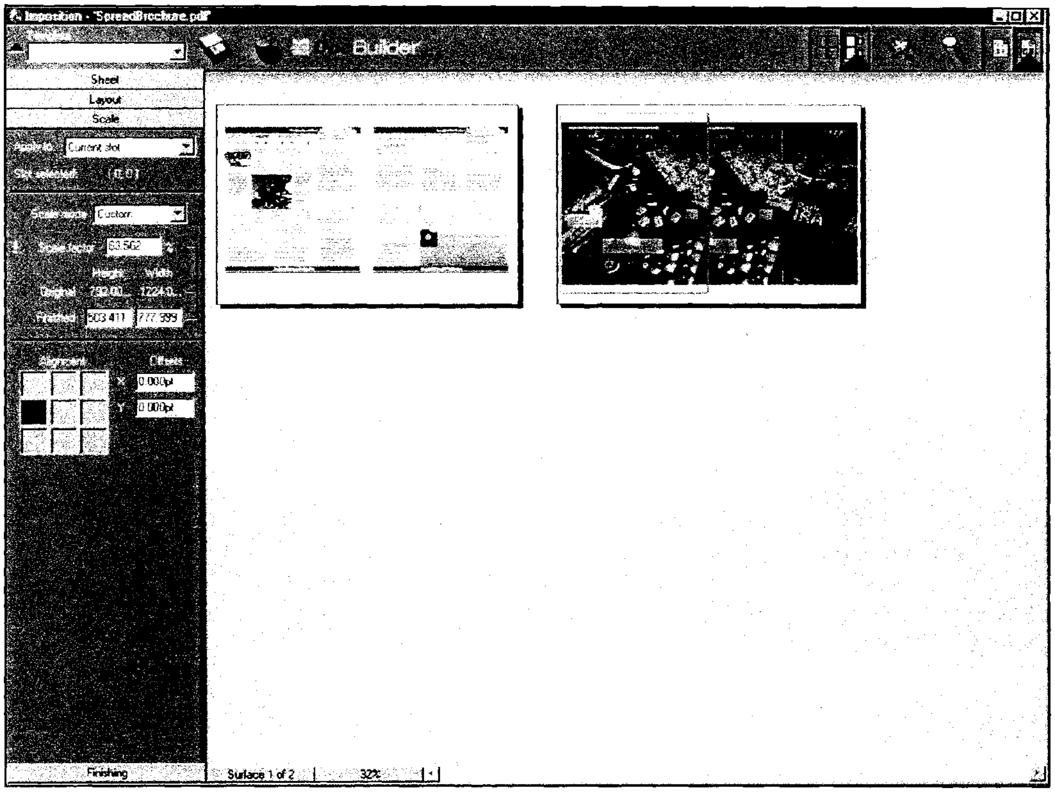
Figure 18:
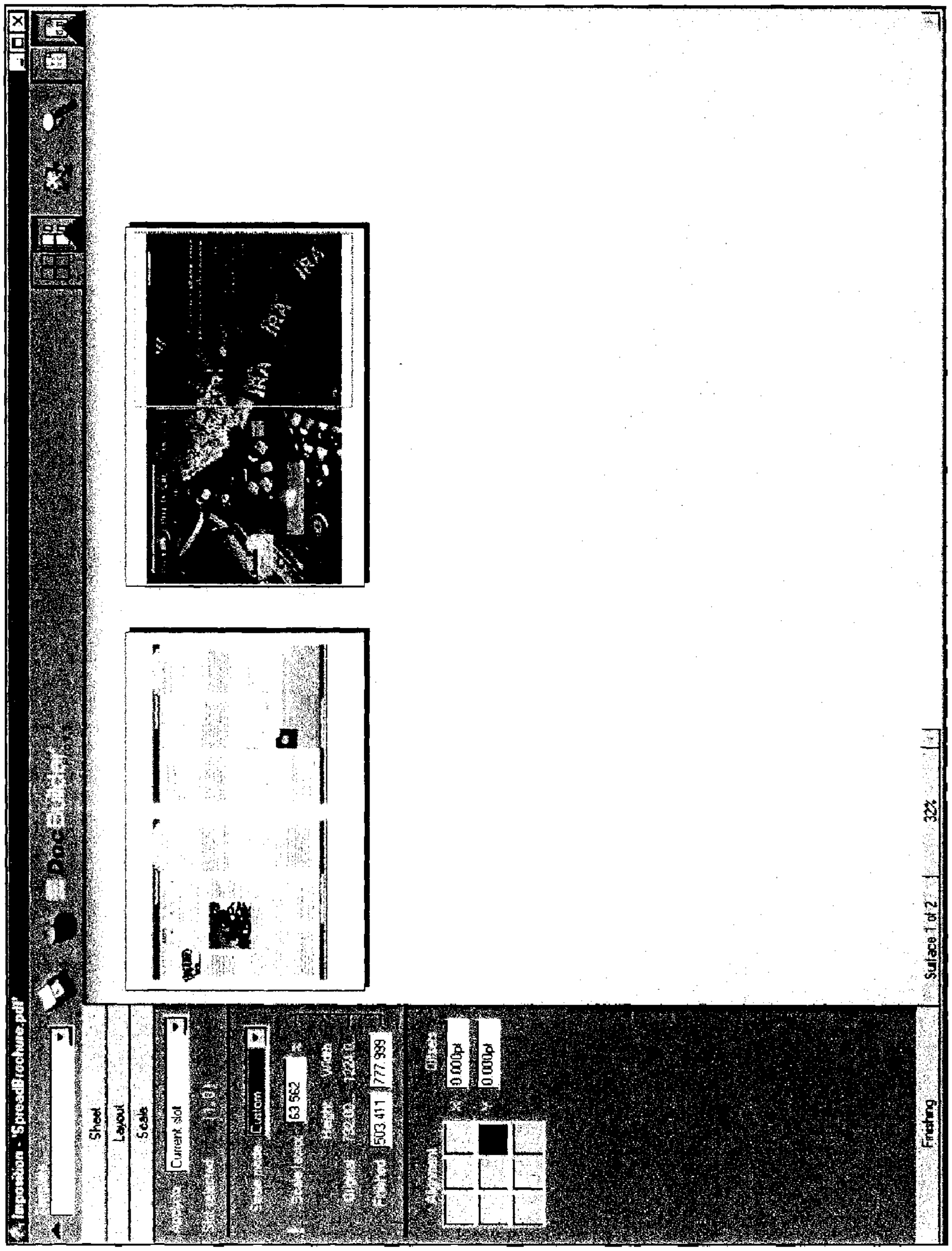

Steps:

a. Impose the document, the mode is automatically switched to "Mixed page mode," as the document contains pages of different sizes.

b. Click on the "Finish Tab" to make sure that the setting is set to "Gang-up-unique."

c. From the "Sheets" settings choose the following (FIG. 12)
Sheet: Letter
Orientation: Landscape
Duplex: On d. From the "Layout" tab choose (FIG. 13)
Row: 1
Column 2
Do not choose Printer's Marks and bleed settings.

e. Click on the preview mode and go to the sheet containing the Cover page. Notice that the cover page is on the left slot of the sheet with the other slot being empty. Now switch to the "Layout mode" by clicking on the "Preview/layout" button.

f. In the "Layout mode", select the slot containing empty page (slot with "0"). Change the page number to be 3, which is the page number of the Cover Page. (FIG. 14)

g. Go Back to the "Preview mode". Now the sheet shall contain two copies of the cover page in both slots. (FIG. 15)

h. Click on the "Scale tab". Select the slot containing the inner page and note the scale factor. (FIG. 16)

i. Select the left slot of the sheet containing the cover page on both the slots. Change the scale mode to custom. Enter the previously noted scale factor. Use the "Alignment matrix button" to set alignment to "Left-Center". (FIG. 17)

j. Repeat the step above on the right slot with the alignment set to "Right-Center". (FIG. 18)

Figure 19:
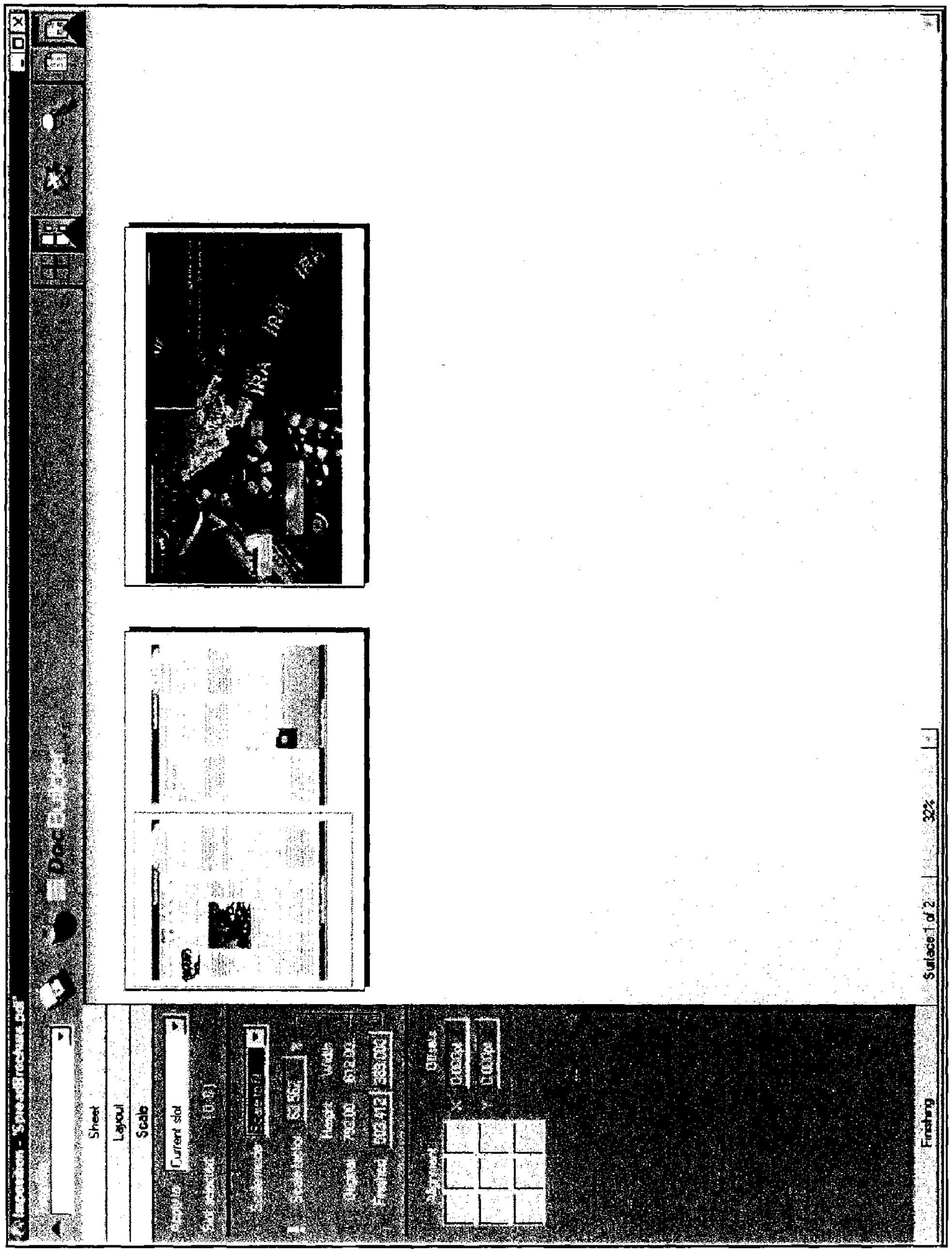

The final imposition is shown in FIG. 19.

An Algorithm for Placing Pages with Different Dimensions on a Sheet According to a Layout As previously described, "Mixed Page Mode" provides for imposing documents with different page sizes on a Sheet according to a specified layout, i.e., number of "rows" and "columns." The idea behind the technique is to divide the sheet into "slots" and then place a page in each of the slot. The following discussion describes the general algorithm used for this purpose.

The inputs for this algorithm are the size of the sheet, the page sizes of the document to be imposed (which may be different for each page) and the number of rows and columns in which to place the pages, along with other parameters such as the gaps, mark lengths, and binding.

The algorithm can be better understood with the help of the following concepts:

ImageAble Sheet: This is the actual area of the sheet where the pages are placed.

Slots: These are the sections in which the sheet is divided into; the pages of the document are placed into these slots. The number of such slots would be the product of the number of rows and the number of columns and each slot of the sheet shall be of the same size.

SlotScaleX: This is the ratio between the width of the slot and the width of the sheet, i.e., slotWidth/sheetWidth.

SlotScaleY: This is the ratio between the height of the slot and the height of the sheet, i.e., slotHeight/sheetHeight.

PageScale: This is the reduction applied to the original page in the document before placing it on the sheet; the final size of the placed page is the original page size times the PageScale (Because the ratio between the width and the height of the page can't be changed, we need only one scale).

The actual algorithm consists of the following four steps:

The calculation of the SlotScales.

The calculation of the PageScales for each page.

The determination of where the slots are on the sheet

The placement of pages within the slots.

The Calculation of the SlotScales

To do this, first the "ImageAble Sheet" is calculated by decreasing from the sheet size the dimensions of the printer marks as required and the gaps specified by the imposition parameters. The width of the slot is then calculated by dividing the width of the "ImageAble Sheet" by the number of columns and the length of the slot by dividing the length of the "ImageAble Sheet" by the number of rows; the ratios follow naturally.

Pseudo code (implementation details omitted):

Input:

| | |
|---|---|
| W | the width of the sheet |
| H | the height of the sheet |
| $M_l$ | the margins on the left (this includes the mark dimensions) |
| $M_r$ | the margins on the right (including the mark dimensions) |
| $M_t$ | the margins on the top(including the mark dimensions) |
| $M_b$ | the margins on the bottom(including the mark dimensions) |
| r | number of rows |
| c | number of columns |
| $G_v$ | array 1 . . . c − 1 of Vertical Gaps (Gaps between columns) |
| $G_h$ | array 1 . . . r − 1 of Horizontal Gaps (Gaps between rows) |

Output:

| | |
|---|---|
| $S_x$ | SlotScaleX |
| $S_y$ | SlotScaleY |

Algorithm:

$$S_y = \left(\left(H - M_t - M_b - \sum_{i=1}^{i=r-1} G_h[i]\right) \Big/ r\right) \Big/ H;$$

$$S_y = \left(\left(H - M_t - M_b - \sum_{i=1}^{i=r-1} G_h[i]\right) \Big/ r\right) \Big/ H;$$

$$\text{return } \{S_x, S_y\}$$

The Calculation of the PageScales for Each Page

The calculation has to be done per page as each page can have different size and therefore a different scale; remember that the slots in which the pages are placed are of the same size for each page. To do this, first the width of the slot is divided by the width of the page, then the height of the slot is divided by the height of the page and the minimum of the two ratios is considered as the page scale; the slot width and slot height are easily obtained after the first step.

Pseudo code (implementation details omitted):

Input:

| | |
|---|---|
| W | width of the sheet |
| H | height of the sheet |
| $S_x$ | SlotScaleX calculated and defined above |
| $S_y$ | SlotScaleY calculated and defined above |
| n | number of pages in the document |
| $P_{heights}$ | array 1 . . . n of page Heights |
| $P_{widths}$ | array 1 . . . n of page Widths |

Output:

| | |
|---|---|
| $P_{scale}$ | array 1 . . . n of pageScales |

Algorithm:

$$\forall\ i,\ i \in \{1, \ldots, n\}$$

$$P_{scale}[i] = f_{min}(((W \times S_x)/P_{widths}[i]),\ ((H \times S_y)/P_{heights}[i]))$$

$$\text{where } f_{min}(a, b) = a,\ a \le b;$$

$$= b,\ b > a;$$

$$\text{return } \{P_{scale}\};$$

The Determination of where the Slots are on the Sheet

To do this, first the left and then the top edge of the left top slot is calculated; the algorithm for both the edges follow the same pattern. At first, the position of either the middle slot or the middle gap is calculated depending on whether the number of columns (or rows for top edge) is odd or even (of course, the margins for the printer marks are deducted first from the sheet size). Then, the left (or top) edge is easily calculated by shifting that position by the required number of slot widths (or heights) and gaps to the left (or top). After the top-left position is calculated, calculation of all other positions is only a matter of shifting the position by correct number of slot sizes and gaps.

Pseudo code (implementation details omitted):

Input:

| | |
|---|---|
| W | width of the sheet |
| H | height of the sheet |
| $M_l$ | the margins on the left (this includes the mark dimensions) |
| $M_r$ | the margins on the right (including the mark dimensions) |
| $M_t$ | the margins on the top(including the mark dimensions) |
| $M_b$ | the margins on the bottom(including the mark dimensions) |
| $n_r$ | number of rows |
| $n_c$ | number of columns |
| $G_v$ | array 1 . . . $n_c$ − 1 of Vertical Gaps(Gaps between columns) |
| $G_h$ | array 1 . . . $n_r$ − 1 of Horizontal Gaps(Gaps between rows) |
| $S_x$ | SlotScaleX calculated and defined above |
| $S_y$ | SlotScaleY calculated and defined above |
| r | the row Number of the Slot |
| c | the column Number of the slot |

Output:

| | |
|---|---|
| $p_l$ | left position of the slot |
| $p_t$ | top position of the slot |
| $p_r$ | right position of the slot |
| $p_b$ | Bottom position of the slot |

Algorithm:

$$I = \text{set of Integers.}$$

$$p_l = \begin{array}{l} M_l + f_{leftOdd}(W - M_l - M_r,\ W \times S_x,\ c,\ n_c,\ G_v); \\ \frac{n_c}{2} \smile I(n_c \text{ is odd}) \end{array}$$

$$= \begin{array}{l} M_l + f_{leftEven}(W - M_l - M_r,\ W \times S_x,\ c,\ n_c,\ G_v); \\ \frac{n_c}{2} \smile I(n_c \text{ is even}) \end{array}$$

$$\begin{array}{c} f_{leftOdd} \\ (W_{sheet}, W_{slot}, c, n_c, G_v) \end{array} = \begin{array}{l} \left(\frac{W_{sheet}}{2} - \frac{W_{slot}}{2}\right) + \left(c - \left\lceil \frac{n_c}{2} \right\rceil\right) \times W_{slot} + \\ f_{oddSumGaps}(c, n_c, G_v); \end{array}$$

$$f_{oddSumGaps}(c, n_c, G_v) = -\sum_{i=\lceil \frac{n_c}{2} \rceil}^{i=c-1} G_v[i];\ c > \left\lceil \frac{n_c}{2} \right\rceil$$

$$= 0;\ c = \left\lceil \frac{n_c}{2} \right\rceil$$

$$= -\sum_{i=\sum c}^{i=|\frac{n_c}{2}|-1} G_v[i];\ c < \left\lceil \frac{n_c}{2} \right\rceil$$

$$\begin{array}{c} f_{leftEven} \\ (W_{sheet}, W_{slot}, c, n_c, G_v) \end{array} = \begin{array}{l} \left(\frac{W_{sheet}}{2} - \frac{G_v\left[\frac{n_c}{2}\right]}{2}\right) - W_{slot} + \left(c - \frac{n_c}{2}\right) \times \\ W_{slot} + f_{evenSumGaps}(c, n_c, G_v); \end{array}$$

$$f_{evenSumGaps}(c, n_c, G_v) = \sum_{i=\frac{n_c}{2}}^{i=c-1} G_v[i];\ c > \frac{n_c}{2}$$

$$= 0;\ c = \frac{n_c}{2}$$

$$= -\sum_{i=c}^{i=\frac{n_c}{2}-1} G_v[i];\ c < \frac{n_c}{2}$$

$$p_r = p_l + W \times S_x;$$

$$p_t = \begin{array}{l} M_t + f_{topOdd}(H - M_t - M_b,\ H \times S_y,\ r,\ n_r,\ G_h); \\ \frac{n_r}{2} \notin I(n_r \text{ is odd}) \end{array}$$

-continued $$= M_t + f_{topEven}(H - M_t - M_b, H \times S_y, r, n_r, G_h); \quad \frac{n_r}{2} \in I(n_r \text{ is even})$$

$$f_{topOdd}(H_{sheet}, H_{slot}, r, n_r, G_h) = \left(\frac{H_{sheet}}{2} - \frac{H_{slot}}{2}\right) + \left(r - \left\lceil\frac{n_r}{2}\right\rceil\right) \times H_{slot} + f_{oddSumGaps}(r, n_r, G_h);$$

$$f_{oddSumGaps}(r, n_r, G_h) = -\sum_{i=\lceil\frac{n_r}{2}\rceil}^{i=r-1} G_h[i]; \; r > \left\lceil\frac{n_r}{2}\right\rceil$$

$$= 0; \; r = \left\lceil\frac{n_r}{2}\right\rceil$$

$$= -\sum_{i=r}^{i=\left|\frac{n_r}{2}\right|-1} G_h[i]; \; r < \left\lceil\frac{n_r}{2}\right\rceil$$

$$f_{topEven}(H_{sheet}, H_{slot}, r, n_r, G_h) = \left(\frac{H_{sheet}}{2} - \frac{G_h\left[\frac{n_r}{2}\right]}{2}\right) - H_{slot} + \left(r - \frac{n_r}{2}\right) \times H_{slot} + f_{evenSumGaps}(r, n_r, G_h);$$

$$f_{evenSumGaps}(r, n_r, G_h) = \sum_{i=\frac{n_r}{2}}^{i=r-1} G_h[i]; \; r > \frac{n_r}{2}$$

$$= 0; \; r = \frac{n_r}{2}$$

$$= -\sum \sum_{i=r}^{i=\frac{n_r}{2}-1} G_h[i]; \; r < \frac{n_r}{2}$$

$$p_b = p_t + H \times S_y; \text{ return } \{p_l, p_t, p_r, p_b\}$$

The Placement of Pages Within the Slots.

Once the rectangles for the slots are calculated, one can easily place the pages inside those rectangles with appropriate pagescales. This scale is alterable by the user and hence the page can be clipped at slot edges. There is a freedom of movement of the pages within a slot and the correct position is determined by the imposition parameters like alignment (left, right, center) and offsets.

Figure 20:
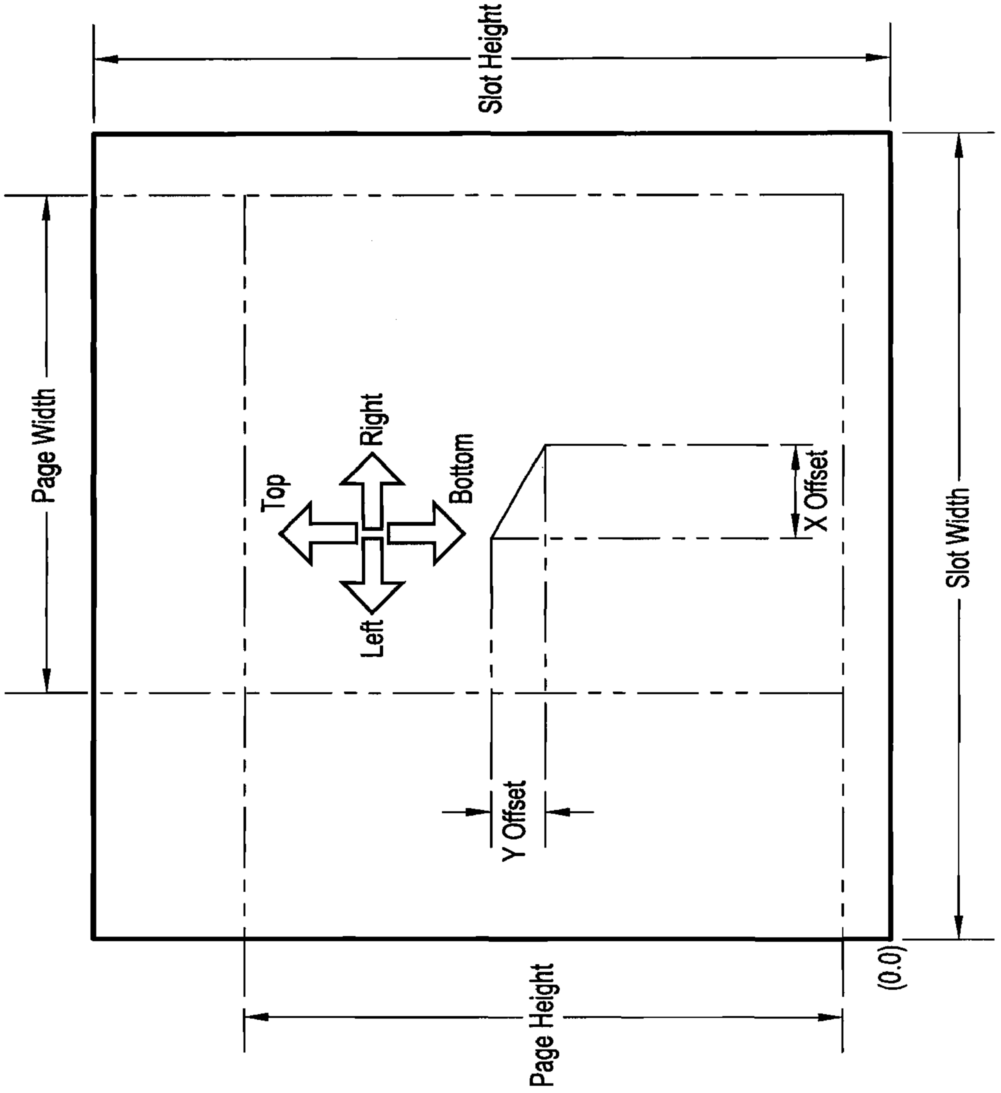
FIG. 20 shows the placement of pages within slots according to the invention.

FIG. 20 shows how this is done. The page is placed within the slot and then moved left, right, top or bottom according to the alignment. FIG. 20 shows a randomly aligned page in a slot. It describes all the different possible movements of the page within the slot.

Although the invention is described herein with reference to a variety of preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method of imposing a plurality of pages on a printable sheet, the plurality of pages including pages of varying size, the method comprising:

displaying on a display device a representation of the printable sheet;

dividing the printable sheet representation into a plurality of slots of equal size;

a computer-implemented operation of calculating SlotScales, comprising:

calculating a ratio between slot width and printable sheet width;

calculating a ratio between slot height and printable sheet height;

for each page, performing a computer-implemented operation of calculating PageScale comprising a reduction factor applied to the page before applying it to the printable sheet;

determining where the slots are positioned on the sheet accounting for margins, number of slot rows, number of slot columns, gaps between columns, gaps between rows, and the SlotScales;

placing pages within the slots comprising:

assigning each of the pages to a corresponding slot;

displaying on the display device a representation of the pages in their corresponding slots;

providing a user interface that allows a user to specify parameters including the following for each slot: page alignment, page offset, PageScale; and adjusting page alignment, offset, and scaling of each of the pages based on the user specified parameters.

2. The method of claim 1, where the operation of calculating SlotScales comprises:

a computer-implemented operation of calculating an Imageable Sheet equal to the printable sheet reduced by dimensions of any user-specified parameters including printer marks and gaps; and computer-implemented operations of calculating SlotScaleX by dividing a width of the Imageable Sheet by total number of the slot columns, and calculating SlotScaleY by dividing a length of the Imageable Sheet by total number of slot rows.

3. The method of claim 1, where the operation of calculating PageScale comprises:

a computer-implemented operation of dividing slot width by page width to produce a first ratio;

a computer-implemented operation of dividing slot height by page height to produce a second ratio;

a computer-implemented operation of designating a minimum of the first and second ratios as the PageScale.

4. A computer readable medium containing non-transitory storage of a program of machine-readable instructions executable by a digital data processor to perform operations to impose a plurality of pages on a printable sheet, the plurality of pages including pages of varying size, the operations comprising:

displaying on a display device a representation of the printable sheet;

dividing the printable sheet representation into a plurality of slots of equal size;

a computer-implemented operation of calculating SlotScales, comprising:

calculating a ratio between slot width and printable sheet width;

calculating a ratio between slot height and printable sheet height;

for each page, performing a computer-implemented operation of calculating PageScale comprising a reduction factor applied to the page before applying it to the printable sheet;

determining where the slots are positioned on the sheet accounting for margins, number of slot rows, number of slot columns, gaps between columns, gaps between rows, and the SlotScales;

placing pages within the slots comprising:

assigning each of the pages to a corresponding slot;

displaying on the display device a representation of the pages in their corresponding slots;

providing a user interface that allows a user to specify parameters including the following for each slot: page alignment, page offset, PageScale; and adjusting page alignment, offset, and scaling of each of the pages based on the user specified parameters.

5. The medium of claim 4, where the operation of calculating SlotScales comprises:

a computer-implemented operation of calculating an Imageable Sheet equal to the printable sheet reduced by dimensions of any user-specified parameters including printer marks and gaps; and computer-implemented operations of calculating SlotScaleX by dividing a width of the Imageable Sheet by total number of the slot columns, and calculating SlotScaleY by dividing a length of the Imageable Sheet by total number of slot rows.

6. The medium of claim 4, where the operation of calculating PageScale comprises:

a computer-implemented operation of dividing slot width by page width to produce a first ratio;

a computer-implemented operation of dividing slot height by page height to produce a second ratio;

a computer-implemented operation of designating a minimum of the first and second ratios as the PageScale.

7. An apparatus for imposing a plurality of pages on a printable sheet, the plurality of pages including pages of varying size, the apparatus comprising:

digital data storage;

a display;

coupled to the storage and the display, a processor programmed to perform operations comprising:

displaying on a display device a representation of the printable sheet;

dividing the printable sheet representation into a plurality of slots of equal size;

a computer-implemented operation of calculating SlotScales, comprising:

calculating a ratio between slot width and printable sheet width;

calculating a ratio between slot height and printable sheet height;

for each page, performing a computer-implemented operation of calculating PageScale comprising a reduction factor applied to the page before applying it to the printable sheet;

determining where the slots are positioned on the sheet accounting for margins, number of slot rows, number of slot columns, gaps between columns, gaps between rows, and the SlotScales;

placing pages within the slots comprising:

assigning each of the pages to a corresponding slot;

displaying on the display device a representation of the pages in their corresponding slots;

providing a user interface that allows a user to specify parameters including the following for each slot: page alignment, page offset, PageScale; and adjusting page alignment, offset, and scaling of each of the pages based on the user specified parameters.

8. The apparatus of claim 7, where the processor is programmed such that the operation of calculating SlotScales comprises:

a computer-implemented operation of calculating an Imageable Sheet equal to the printable sheet reduced by dimensions of any user-specified parameters including printer marks and gaps; and computer-implemented operations of calculating SlotScaleX by dividing a width of the Imageable Sheet by total number of the slot columns, and calculating SlotScaleY by dividing a length of the lmageable Sheet by total number of slot rows.

9. The apparatus of claim 7, where the processor is programmed such that the operation of calculating PageScale comprises:

a computer-implemented operation of dividing slot width by page width to produce a first ratio;

a computer-implemented operation of dividing slot height by page height to produce a second ratio;

a computer-implemented operation of designating a minimum of the first and second ratios as the PageScale.

* * * * *